US012729143B2

(12) United States Patent
Roche et al.

(10) Patent No.: US 12,729,143 B2
(45) Date of Patent: Sep. 8, 2026

(54) METHOD AND INSTALLATION FOR CONTROLLED MICROBIOME SHIFT FOR BIOMASS DENSIFICATION IN A BIOLOGICAL TREATMENT OF A RAW INFLUENT

(71) Applicants: SUEZ INTERNATIONAL, Paris la Defense Cedex (FR); NEWPORT GMBH, Innsbruck (AT)

(72) Inventors: Clément Roche, Saint-Andre en Vivarais (FR); Sylvain Donnaz, Richebourg (FR); Sudhir N. Murthy, Innsbruck (AT); Bernhard Wett, Innsbruck (AT)

(73) Assignees: SUEZ INTERNATIONAL, Paris la Defense (FR); NEWPORT GMBH, Innsbruck (AT)

( * ) Notice: Subject to any disclaimer, the term of this patent is extended or adjusted under 35 U.S.C. 154(b) by 430 days.

(21) Appl. No.: 18/029,631

(22) PCT Filed: Oct. 1, 2021

(86) PCT No.: PCT/EP2021/077094
§ 371 (c)(1),
(2) Date: Mar. 30, 2023

(87) PCT Pub. No.: WO2022/069707
PCT Pub. Date: Apr. 7, 2022

(65) Prior Publication Data

US 2023/0365446 A1 Nov. 16, 2023

(30) Foreign Application Priority Data

Oct. 2, 2020 (EP) .................................... 20306143

(51) Int. Cl.
*C02F 3/00* (2023.01)
*C02F 3/08* (2023.01)
(Continued)

(52) U.S. Cl.
CPC .............. *C02F 3/006* (2013.01); *C02F 3/082* (2013.01); *C02F 3/102* (2013.01); *C02F 3/12* (2013.01);
(Continued)

(58) Field of Classification Search
CPC .......... C02F 3/12; C02F 3/1221; C02F 3/006; C02F 3/102; C02F 2203/004; C02F 2209/01
(Continued)

(56) References Cited

U.S. PATENT DOCUMENTS 6,387,264 B1 5/2002 Baur
2014/0144836 A1 5/2014 Nyhuis et al.
(Continued)

FOREIGN PATENT DOCUMENTS

CN 106 219 754 A 12/2016
WO 2020/006297 A1 1/2020

OTHER PUBLICATIONS

Li, et al., "Biomass density-function relationships in suspended growth biological processes—A critical review", Water Research, vol. 111, pp. 274-287, 2017.
(Continued)

*Primary Examiner* — Claire A Norris
(74) *Attorney, Agent, or Firm* — Baker Hostetler

(57) ABSTRACT

A method for controlled biomass densification in a biological treatment of a raw influent, includes a step of subjecting the raw influent to a biological treatment of free suspended biomass, thereby producing a biomass comprising activated sludge; a step of separation and/or clarification of the
(Continued)

activated sludge, thereby producing an effluent and a RAS; a step of extracting at least part of the RAS and/or part of the activated sludge as a first source of a WAS; a step of external density-based selection of at least part of the RAS and/or part of the activated sludge, thereby generating an overflow intended to be extracted as a second source of WAS, and an underflow comprising dense biomass aggregates; a step of producing and/or sustaining dense biomass aggregates, such as aerobic granular sludge or biofilm, by a dense biomass aggregates generating process, with at least part of the raw influent; a step of subjecting the dense biomass aggregates to the biological treatment; a step of subjecting the dense biomass aggregates of the underflow to the biological treatment and/or to the dense biomass aggregates generating process; thereby obtaining a densified biomass.

18 Claims, 7 Drawing Sheets

(51) Int. Cl.
*C02F 3/10* (2023.01)
*C02F 3/12* (2023.01)

(52) U.S. Cl.
CPC .... *C02F 2203/004* (2013.01); *C02F 2209/01* (2013.01)

(58) Field of Classification Search
USPC .......................................................... 210/614
See application file for complete search history.

(56) References Cited

U.S. PATENT DOCUMENTS

| | | | | |
|---|---|---|---|---|
| 2015/0376043 | A1 | 12/2015 | Wett et al. | |
| 2016/0137537 | A1 | 5/2016 | Bott et al. | |
| 2018/0009687 | A1* | 1/2018 | Murthy | C02F 3/307 |
| 2018/0230034 | A1 | 8/2018 | Horjus | |
| 2020/0048131 | A1* | 2/2020 | Stensel | C02F 11/06 |

OTHER PUBLICATIONS

Pennsylvania Department of Environmental Protection: “Wastewater Treatment Plant Operator Certification Training. Module 16: The Activated Sludge Process Part II”, 2014. https://files.dep.state.pa.us/water/bsdw/operatorcertification/TrainingModules/IGs/ww16_sludge_2_ig.pdf.
Kreuk, et al., “Aerobic granular sludge—state of the art”, Water Sci Technol, vol. 55, No. 8-9, pp. 75-81, 2007.
Wei, et al., “Flocs in disguise? High granule abundance found in continuous-flow activated sludge treatment plants”, Water Res., vol. 179; 115865, 2020.
Whipps, et al., “Mycoparasitism and plant disease control”, Burge M (Ed.) Fungi in Biological Control Systems, Manchester University Press, pp. 161-187, 1988.
Henze, et al., “Activated Sludge Models ASM1, ASM2, ASM2D, ASM3”, IAW Publishing in scientific and technical reports series, pp. 9-10, 2000.
Houweling, et al., “Intensifying Activated Sludge Using Media-Supported Biofilms”, CRC Press, pp. 85-86, 2020.
Torfs, et al., “Experimental Methods In Wastewater Treatment”, IWA Publishing, pp. 235-262, 2016.
Kynch, “A theory of sedimentation”, Transactions of the Faraday Society, vol. 48, pp. 166-176, 1952.

* cited by examiner 10
111
100
109
106
105
101
103
110
112
113
107
102
104
108

184
10
50
18
67
60
70
12
153
131
RAS
WAS
40
14
152
90
16, 17
151

METHOD AND INSTALLATION FOR CONTROLLED MICROBIOME SHIFT FOR BIOMASS DENSIFICATION IN A BIOLOGICAL TREATMENT OF A RAW INFLUENT

CROSS-REFERENCE TO RELATED APPLICATIONS

This application is a National Stage of International patent application PCT/EP2021/077094, filed on Oct. 1, 2021, which claims priority to foreign European patent application No. EP 20306143.7, filed on Oct. 2, 2020, the disclosures of which are incorporated by reference in their entirety.

The invention relates to the field of wastewater treatment, more particularly to activated sludge process.

TECHNOLOGICAL BACKGROUND

In wastewater treatment, the "Activated sludge" process step performs biological purification, through the degradation of organic matter, both in suspension or dissolved in wastewater, by free culture microorganisms. Good levels of biodegradation may be obtained thanks to homogenization of medium—thus allowing microorganisms to access the pollution (carbon, nitrogen, and phosphorus pollution)—and aeration. The resulting mixture of microorganism and other suspended solids in water is referred to as sludge, which is then separated from the treated effluent in a subsequent dedicated solid liquid separation step.

A limiting factor in such activated sludge wastewater treatment is the "concentration" of the sludge. Indeed, it is directly related to the potential of the process for treating a pollutant load, i.e. to the performance of the biological treatment step. It does also limit the design of the subsequent clarification step and the performance of the following sludge treatment.

Sludge concentration may be measured by its settling ability, generally expressed by the Mohlman index. The Mohlman index, also called Sludge Volume Index (SVI), defines the volume of activated sludge settled in half an hour with respect to the mass of dry residue of said sludge. The lowest the dSVI (for diluted Sludge Volume Index), the better the settling ability.

In all Conventional Activated Sludge (CAS) systems, the activated sludge settling ability generally depends on a combination of the variability of raw water characteristics (flow, pollution loads, concentrations (raw water dilution) and temperature seasonal patterns) referred to as "environmental factors", and of the biological reactor design configurations (plug flow reactor, totally mixed reactor, presence of a contact zone, an anoxic zone, an anaerobic zone), referred to as "biological design factors".

Environmental as well as biological design factors have key influence on the range of settling ability that can be expected for any activated sludge and have a direct impact in terms of design and operational performance. As a result, each waste water treatment plant has its own range of yearly SVI variations, which can be very scattered over the year. For instance, bulking period of activated sludge are known to occur during low-temperature high dilution seasons, such as late winters/early springs.

This is of course detrimental to design and operations, as the expected worst settling ability defines the design, which then in turns draws the boundaries for operational performance. Solutions have thus been developed in the prior art to try and improve the settling ability of activated sludge.

A first solution is the use Granular Activated Sludge, such as defined for instance in de Kreuk et al. (M. K. de Kreuk, N. Kishida, M. C. M. van Loosdrecht "Aerobic granular sludge—state of the art." *Water Sci Technol* 1 Apr. 2007; 55 (8-9): 75-81). Granular Activated Sludge was indeed shown to possess better settling ability. However, the process for producing granular sludge is rather capricious, and unstable.

Wei et al. (Wei S P, Stensel H D, Nguyen Quoc B, et al. «Flocs in disguise? High granule abundance found in continuous-flow activated sludge treatment plants. *Water Res.* 2020; 179; 115865) recently disclosed the occurrence of partial but natural granulation in all CAS (Conventional Activated Sludge) systems, highlighting a correlation between low SVI and higher partial granulation proportion. Wei et al. pointed out that certain configurations generate more "baby granules" than others, thus expanding the definition of granules to particles of <200 μm. It was observed in particular that higher proportions of granules are obtained in systems including Anaerobic selectors and Plug flow configurations. However, this study is still imprecise with regards to yearly variation span. However, this study does not point to any means of controlling the granulation phenomenon, let alone the SVI.

An alternative lies in the use of sludge external gravimetric selection, which allows to concentrate "dense" sludge into the activated sludge process. More specifically, an external selector collects and retains biomass aggregates that have a concentration gradient of substrate and electron acceptor that favors granule formation over floc and filament formation. It further operates on the biomass waste stream to waste filaments and flocs in the biomass waste stream. As compared with granular activated sludge and conventional activated sludge, sludge obtained with gravimetric selection (1) does not require the use of external carrier material to form biological aggregates; (2) Activated sludge flocs tend to coagulate when they settle (when liquid-sludge mixture is not aerated or stirred), whilst granules do not coagulate and settle as separate units; (3) settles significantly faster than activated sludge flocs; (4) may be harvested by sieving. For instance, document US 2014/0144836 describes an internal biological reactor combining wastewater and a recycled biomass, outputting a biomass waste stream that includes a granular biomass. The collected biomass aggregates are returned to the internal biological reactor for granule formation. In this document, the densified biomass is only defined by a SVI lower than 100 mL/g.

However, there is still a need for installations and methods allowing to better control sludge settling ability and render it as little dependent from environmental factors as possible. Such methods should be easy to implement preferably on a wide range of existing CAS processes. The installations should have a reduced footprint (and capital expenditures) for a given treatment capacity, while not compromising treatment quality (water purification level).

SUMMARY

The present invention thus provides a method for operating a controlled shift of existing activated sludge biomass into a new densified biomass displaying reliably superior settling and thickening abilities, in particular in a continuous flow activated sludge process. The shift is obtained via the combination of a process generating "dense biomass aggregate" with an external gravity-based selection (such as disclosed in documents US20150376043 A1 and US20160137537 A1). Density-based or densified biomass aggregates either show increased gravitational density or density in terms of higher diffusion resistance due to compact structure or size, specified by a higher percentage of densified biomass aggregates greater than 100 μm in the biomass. The result of this densification is a controlled and narrower dSVI operating span, which allows for increased clarifier upflow velocities, both in operation and design.

As used herein, the "microbiome" may be defined as a characteristic microbial community occupying a reasonably well-defined habitat which has distinct physio-chemical properties. The microbiome not only refers to the microorganisms involved but also encompass their theatre of activity, which results in the formation of specific ecological niches (see Whipps J., Lewis K. and Cooke R. (1988) "Mycoparasitism and plant disease control". In: Burge M (Ed.) Fungi in Biological Control Systems, Manchester University Press, pages 161-187. ISBN 9780719019791).

Without wishing to be bound by theory, the control shift in the microbiome as disclosed by the invention is obtained by transitioning the microbial consortium and the associated structure of the biomass-aggregates and externally selecting for these aggregates. More specifically, the controlled microbiome shift is obtained by:

- selection of a biomass with superior settling—and thickening properties, which allows to design and operate the system at higher overall biomass inventory;
- retention a biomass-fraction with a higher solids retention time (SRT), which results in the accumulation of organisms with biological nutrient removal activity (e.g. nitrifiers, anaerobic ammonia oxidizers, denitrifying methane oxidizers, and phosphorus accumulating organisms) thus facilitating new approaches for efficient reactor design and operations.

In a first aspect, the invention thus relates to a method for controlled biomass densification in a biological treatment of a raw influent, characterized in that it comprises:

- A step of subjecting the raw influent to a biological treatment of free suspended biomass, thereby producing a biomass comprising activated sludge;
- A step of separation and/or clarification of the activated sludge, thereby producing an effluent and a RAS;
- A step of extracting at least part of the RAS and/or part of the activated sludge as a first source of a waste activated sludge (WAS);
- A step of external density-based selection of at least part of the RAS and/or part of the activated sludge, thereby generating an overflow intended to be extracted as a second source of WAS, and an underflow comprising dense biomass aggregates;
- A step of producing and/or sustaining dense biomass aggregates, such as aerobic granular sludge (AGS) or biofilm, by a dense biomass aggregates generating process, with at least part of the raw influent;
- A step of subjecting the dense biomass aggregates to the biological treatment;
- A step of subjecting the dense biomass aggregates of the underflow to the biological treatment and/or to the dense biomass aggregates generating process; p2 thereby obtaining a densified biomass;
- A step of controlling the amount of the raw influent fed to the dense biomass aggregates generating process and/or a step of controlling the amount of the waste activated sludge (WAS) extracted from the first source of the waste activated sludge (WAS) and/or from the second source of the waste activated sludge (WAS):

configured so as to maintain a densified biomass having:

- a dSVI between 35 and 100 ml/g, and/or
- more than 10% of particles with a particle size of between 100 μm and 1000 μm, and/or
- a dSVI30/dSVI10 ratio comprised between 70% and 95%.

In another aspect, the invention relates to an installation for controlled biomass densification in a biological treatment of a raw influent, said installation comprising:

- A biological tank containing free suspended biomass having a first inlet, a second inlet and a first outlet, the biological tank being configured to be fed at the first inlet with at least a part of the raw influent and RAS to produce a mixture of treated water and activated sludge recovered at the first outlet;
- A separation unit, having a first inlet, a first outlet and second outlet, the separation unit being configured to be fed at the first inlet with the activated sludge and to produce an effluent recovered at the first outlet and a RAS recovered at the second outlet;
- An extracting device configured to extract at least part of the RAS and/or part of the activated sludge as a first source of a WAS;
- An external gravity-based selector having a first inlet, a first outlet and a second outlet, the external gravity-based selector being configured to be fed at the first inlet by at least part of the RAS and/or part of the activated sludge and to generate an overflow intended to be extracted at the first outlet as a second source of the WAS and an underflow comprising dense biomass aggregates recovered at the second outlet;
- A dense biomass aggregate production and/or sustaining unit having a first inlet, optionally a second inlet, a optionally third inlet, and a first outlet, the dense biomass aggregate production and/or sustaining unit tank being configured to be fed at the first inlet with at least a part of the raw influent and optionally at the second inlet with the underflow and to form dense biomass aggregates, such as aerobic granular sludge or biofilm, recovered at the first outlet;
- the biological tank being further configured to be fed at the second inlet with the produced dense biomass aggregates and optionally with at least part of the dense biomass aggregates recovered at the selector underflow, thereby obtaining a densified biomass;
- a controller of the amount of the raw influent fed to the dense biomass aggregate production and/or sustaining unit and/or a controller of the amount of the waste activated sludge (WAS) extracted from the first source of the waste activated sludge (WAS) and/or from the second source of the waste activated sludge (WAS).

Technical advantages of the invention are:

- Possibility to design clarifiers at higher Surface Overflow Rate (SOR), at less total depth, and surface mass-loading beyond of the state-of-the-art recommendation,
- Allowing for increased upflow velocities in clarifier on existing system in order to manage and minimize Combined Sewage Overflow (CSO) occurrences and to more easily fulfill "reference" flow calculation thresholds in terms of performance and compliance in a brownfield context, especially—but not limited to—as defined by the European Decree of Jul. 21, 2015,
- Allowing to operate the clarifier at a lower recycled activated sludge (RAS) rate, which results in less dilution in the treatment reactors and less internal hydraulic load,
- Allowing a reduction in reactor volume due to the higher biomass concentration and the uncoupling of the SRT of the two biomass fractions.

Furthermore, the invention allows to significantly increase the "reference flow" of the plant and to reduce the "number of annual overflows", as defined by the European "wastewater directive" 91/271/CEE.

Another advantage of the invention is an increased quality of the treated water effluent obtained in the secondary treatment step. This may allow for having a more efficient and/or more competitive tertiary treatment (impact on total suspended solids (TSS), but also total organic carbon (TOC), and BOD), resulting in a more competitive operational expenditure (OPEX) (energy, chemicals etc) as well as capital expenditure (CAPEX).

The microbiome shift obtained with the method and installation of the invention is supported by sludge retention time (SRT) uncoupling, which allows for having two biomasses with two different sludge ages:

- Ordinary heterotroph organisms (OHO) in the form of flocculated biomass undergoes a low sludge age which is beneficial for denitrification kinetics;
- Nitrifiers, anaerobic ammonia oxidizers, denitrifying methane oxidizers, denitrifying polyphosphate accumulating organisms, or denitrifying methylotrophs, or optionally any other slow growing organisms associated with the nitrogen or phosphorus cycle, in the form of free suspended biofilm aggregates which can be sustained in the system due to the long SRT provided by the gravimetric selection on the aggregated biomass fraction;
- Organisms (such as fermenters but also those of a higher order) or reactions such as those responsible for particle breakup and/or anaerobic, anoxic and aerobic hydrolysis reactions; in the form of free suspended biofilm aggregates which can be sustained in the system due to the long SRT provided by the gravimetric selection on the aggregated biomass fraction.

Thanks to this uncoupling, biological tank design can be much more competitive. Indeed, the biological system apparent "aerobic SRT" can be designed below the Nitrification Wash-out threshold used in the state-of-the-art CAS and IFAS (Integrated Fixed-film Activated Sludge) design practices. It results in the possibility to reduce the aeration volume as well as anoxic volume while obtaining same treatment performance. In that view, the proposed invention enables both a microbiome-shift into denser microbial clusters or aggregates, supporting the densification of the overall biomass, as well as microbiome-shift of the microorganism population, namely the nitrifying biomass which in the case of the invention is shifted onto and within the densified biomass aggregates.

BRIEF DESCRIPTION OF THE DRAWINGS

The accompanying drawings illustrate various non-limiting, exemplary, innovative aspects in accordance with the present description.

DETAILED DISCLOSURE

Figures 1, 2:
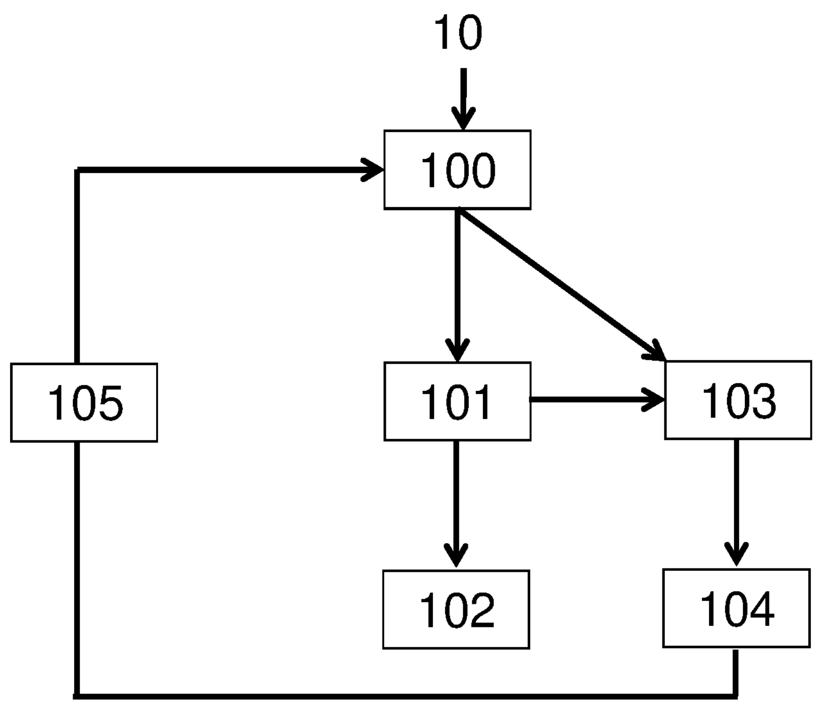
FIG. 1 schematically represents a block diagram with the steps of the method for controlled biomass densification in a biological treatment of a raw influent according to the invention.
FIG. 2 schematically represents a block diagram with steps of the method for controlled biomass densification in a biological treatment of a raw influent according to the invention.

As used herein, the term "a", for in the expression "a unit" is to be understood to encompass "one" or "several" units, which may be arranged in in series or in parallel, in tributary or distributary configurations. Furthermore, any described series approach can be implemented in parallel or in the in tributary or distributary formats, and any described parallel approach can be implemented in series or in the in tributary or distributary formats. Furthermore, any parallel or series or tributary or distributary approach or units can be implemented as an integrated singular approach or unit.

As known in the art, a sludge is a specific type of biomass.

As used herein, a "biological treatment" is understood as a biological treatment containing activated sludge—in particular continuous flow biological treatments—, i.e. any free suspended biomass process design configuration and secondary bioreactor technology such as, for example, MLE (Modified Ludzack-Ettigner) process, 2 stage-BardenPho process, Step feed, Oxidation ditch, Sequenced Anoxic/Oxidation, Anaerobic-Anoxic-Oxidation (A2O), Anoxic-Oxidation (AO), AO-(AO)n, Anoxic-Oxidation-Endogenous, MBR (Membrane Bioreactor), IFAS (Integrated Fixed-Film Activated Sludge), MABR (Membrane Aerated Biofilm Reactor), trickling filters, rotating biofilm contactors.

The raw influent (10) may comprise or consist in at least part of internal plant returns (68).

The separation is a solid-liquid separation, and may be a clarification, a sedimentation, a filtration or a floatation. It is advantageously operated in a clarifier, membrane filter or sedimentation system. The separation unit may also be a filter or a floatation unit, such as a dissolved air floatation (DAF). Preferably, the separation is a clarification.

As used in the present invention, "dense biomass aggregates" are understood as a biomass comprising or consisting of either aggregates having a particle size of 100 µm or more, preferably of 200 µm or more, or a density greater than 1.03 g/cm$^3$ preferably greater than 1.05 g/cm$^3$. Typically, the aggregates have a particle size of less than 1000 µm, for instance the aggregates have a particle size of between 200 and 500 µm.

As use herein, the term "dense" is understood in both its gravitational and diffusional sense, that is to say that size and shape of the particles (granules and/or flocs and/or aggregates) may be as important to consider as their weight. Indeed, a "dense" biomass as per the present invention is understood as a biomass with improved settling ability, which is impacted by both dimensions.

As used in the present invention, "densified biomass" is understood as a mixture of "dense biomass aggregates" and "flocculated activated sludge biomass", with the properly adjusted and controlled proportions of "dense (aerobic granular) biomass aggregates" to ballast the mixture, thus conferring to the overall "densified sludge" mixture some very good and controlled settling ability. Specifically, densified biomass is understood as a biomass showing a dSVI (diluted SVI) of between 35 and 100 mL/g, preferably 40 to 80 ml/g, more preferably 40 to 70 ml/g, with a mass proportion from 10 to 50% (preferably 20 to 40%) of particles greater than 100 µm (up to 1000 µm; preferably between 200 µm and 500 µm), and settling speeds of between 2.0 and 9.0 m/h. It is also characterized by a high proportion by mass (between 50% and 90%) of biological flocs of size lower than 100 µm (preferably lower than 200 µm). This densified sludge can also be characterized by the limit mass flow criterion which is greater than or equal to 8.5 kg MLSS·m$^{-2}$·h$^{-1}$ (MLSS=Mixed Liquor Suspended Solids). The densified biomass usually displays a dSVI30/dSVI10 ratio comprised between 70% and 95% (as opposed to AGS for which this ratio is of 100%), and a typical dSVI30/dSVI5 ratio comprised between 55% and 85%.

The (d)SVI is measured according to standard NF EN 14702-1 of July 2006.

The particle size, which herein refers to the maximum size of the particle, may be determined by statistical analysis of electron microscopy images.

The mass proportion of biological flocs is expressed in %, associated with a size—for example, the percentage of particles of less than 0.2 mm. This value can be obtained by sieving a biomass sample through sieves with different mesh sizes (for example 200 µm/400 µm/500 µm/800 µm/1 mm/1.25 mm). The SS concentration (suspended matter) of the filtrate obtained is then measured, which is then related to the SS concentration of the raw sludge (in %).

The limit mass flow is expressed in kg·m$^{-2}$h$^{-1}$. It represents the amount of MLSS settling per unit of area and time. It measures the velocity rate of a sludge at a given concentration. The limit mass flow is determined from the Kynch curve, by performing several successive dilutions or concentrations of the raw biomass (sludge).

As used herein, a "selector" is understood as a means to separate dense biomass (underflow) from non-dense biomass (overflow) in a biomass flow (input flow). In other words, it selects dense biomass to be returned or recovered in the process, while wasting non-dense biomass, thus enriching the system into sludge with higher settling ability. In the invention, the overflow comprises flocculated activated biomass. The selector underflow typically recovers a well settling biomass (containing high proportion of "dense biomass aggregates"), advantageously displaying optimized and controlled dSVI ranging from 15 to 70 mL/g, typically with a proportion of 20% to 70% aggregates greater than 100 µm (up to 1000 µm; preferably between 200 and 500 µm). The selector overflow typically recovers a lower settling ability biomass (fluffy flocs, pin flocs, filamentous flocs . . . ), containing high proportions of flocculated biomass, generally displaying uncontrolled dSVI ranging from 60 to 250 mL/g, typically with a proportion of 5 to 18% aggregates greater than 100 µm (up to 1000 µm; preferably between 200 and 500 µm). In the present invention, the selector is external, and gravity based (or gravimetric). The gravimetric selector may be a centrifuge, a hydrocyclone, a lamella, a clarifier, a screen, a sieve, a filter, a classifier, or a combination thereof. Preferably, it is a hydrocyclone, such as disclosed for instance in US20160137537 A1. The selector may comprise one or several units. In other words, it may be a single or multiple selector. When the selector comprises multiple units, these may be arranged in series or in parallel, in tributary or distributary configurations.

FIG. 1 schematically represents a block diagram with the steps of the method for controlled biomass densification in a biological treatment of a raw influent 10 according to the invention. The method comprises a step 100 of subjecting the raw influent 10 to a biological treatment of free suspended biomass, thereby producing a biomass 11 comprising activated sludge AS. The biological treatment tank may contain anaerobic, anoxic and oxic compartment. More generally the biological treatment is any biological treatment configuration that involves free suspended biomass, preferably containing an anaerobic step but not limited to.

The method comprises a step 101 of separation of the biomass 11 comprising activated sludge AS, thereby producing an effluent 12 and a return activated sludge RAS.

The method comprises a step 102 of extracting at least part of the RAS and/or part of the activated sludge AS as a first source 13 of a waste activated sludge WAS. Extracting the RAS is less expensive since it presents a high concentration and requires less pumping effort.

The method of the invention further comprises a step 103 of external or density-based selection of at least part of the return activated sludge RAS and/or part of the activated sludge AS, thereby generating an overflow 14 intended to be extracted as a second source 15 of the waste activated sludge WAS, and an underflow 16 comprising a first part of dense biomass aggregates 17. The underflow 16 is recirculated in the treatment process, either in step 100 or in step 105. This solution enables to control the fluxes flowing in and out the selection, thus leading to a finer selection compared to an internal selection.

The method of the invention comprises a step 104 of producing and/or sustaining the first part of dense biomass aggregates (17), such as aerobic granular sludge (AGS) or biofilm, by a dense biomass aggregates generating process (67) with at least part of the raw influent 10, and optionally at least part of internal plant returns (68). Step 104 takes place in a dense biomass aggregate production and/or sustaining unit 18.

The method according to the invention further comprises a step 105*a* of subjecting the dense biomass aggregates of step 104 and optionally at least part of the dense biomass aggregates of the underflow 16 to the biological treatment of step 100.

In other words, the method comprises a step (105*b*) of subjecting the first part of the dense biomass aggregates (17) of the underflow (16) to the biological treatment and/or to the dense biomass aggregates generating process (67).

From the recirculation of the dense biomass aggregates of the underflow 16 in the step 104 of producing and/or sustaining dense biomass aggregates and/or in the step 100, it follows that a densified biomass is obtained and sustained into the system, said densified biomass comprising a consortium of mixed biomass aggregates in the form of aerobic granular sludge (AGS) and activated sludge.

In a variant of the method of the invention, the step 104 is a step of feeding a contact tank 18 (also referred to hereinafter as a feast zone 18), with the underflow 16 and at least a part of the raw influent 10 and optionally part of internal plant returns (68), thereby forming aerobic granular sludge AGS. This leads to a bioaugmentation phenomenon. The feast zone 18 increases the contact of the underflow 16 containing higher size microbial forms with part or totality of the raw influent 10, in order to promote AGS formation, with a preferential growth of aggregate greater than 200 μm.

On the one hand, there is a direct extraction (13) of waste activated sludge WAS from RAS or from the biological tank. The RAS or AS is also directed to the external gravity-based selection. WAS is also extracted via the external gravity-based selection as the overflow (14). On the other hand, the underflow (16) containing the recovered dense biomass aggregates (17) is sent to the production and sustaining unit, here a contact tank. There is no admission of RAS in the production and sustaining unit (contact zone). In the invention only the retained aggregates are contacted with the fresh carbon, which promotes mainly the growth of existing aggregates. Managing the influent load percentage to the feast zone (18) is a way to control the aggregate growth rate in comparison to ordinary heterotroph organisms (OHO). The more influent in the dense biomass aggregate production and/or sustaining unit (18), the more the aggregates (17) will uptake fresh carbon available in the influent, thus the less will be available for the OHO (Ordinary Heterotrophic Organisms).

The microbiome shift of the invention is controlled through the extraction of part or totality of the WAS, in particular via the selector overflow (14). This controlled extraction enables to control the amount extracted via the external gravity-based selection and in direct extraction (13), in order to modulate the wastage of aggregate.

The invention results in the bio-augmentation of dense sludge through selective extraction of excess biological sludge: those with poor settling characteristics are extracted as a priority. The retention and recirculation of the first part of the dense biomass aggregate (17) of the underflow (16) in the feast zone (18) and/or in the biological tank promotes their growth and their subsequent bio-augmentation in the biological tank. This results in the establishment of a densified biomass, conferring the following advantages:

- Improvement of the Mohlman index (and dSVI) in absolute value and limitation of their variability over the year: elimination of the phenomenon of "filamentous bulking" in winter—spring periods;
- Increase in the settling velocity of mixed liquor, providing better resilience of the clarification in rainy weather (less risk of loss of TSS (Total Suspended Solids)) at hydraulic peak, better management of combined sewage overflows and minimization of spills in the natural environment);
- Substantial reduction in the production of scum and stable biological foams;
- Improvement of the quality of the treated water at the secondary clarification outlet.

The invention offers a new way to control the dense biomass aggregate percentage in the mixed liquor and consequently a way to control the dSVI of the activated sludge biomass, regardless of the seasonality of "environmental factors".

As explained before, a given plant according to its biological design factors and yearly average environmental factors has a certain percentage of aggregates greater than 200 μm which induces a base dSVI. This SVI is then seasonally fluctuating over the year because of fluctuating environmental conditions and follows a quite repetitive pattern if environmental factors fluctuation is repeatable. Of course, better biological design factors such as the presence of anaerobic selectors or contact zone induces a more stable and narrower dSVI variation.

Identically a climate and influent quality that is quite stable all year long will favor dSVI stability. On the opposite, highly changing climate conditions, with marked rainy season inducing high variability of the influent quality will generate higher volatility of aggregate fraction, thus inducing large dSVI variation.

Densified sludge with the help of external gravity-based selection allows for:

- Maintaining dense biomass aggregate in the biological system during unfavorable periods;
- Favoring bioaugmentation of denser aggregates during favorable periods;
- Resulting in a control shift of the microbiome towards a higher proportion of aggregates to obtain a lower and narrower dSVI variation.

FIG. 2 schematically represents a block diagram with steps of the method for controlled biomass densification in a biological treatment of a raw influent according to the invention. The method of the invention further comprises a step 106 of controlling the amount of the raw influent 10 and/or internal plant returns (68) fed to the dense biomass aggregates generating process (67) in the dense biomass aggregate production and/or sustaining unit 18. It further comprises a step 107 of controlling the amount of the waste activated sludge WAS extracted from the first source 13 of the waste activated sludge WAS and/or from the second source 15 of the waste activated sludge WAS.

Controlling the proportion of the extraction sent through the external gravity-based selection enable to control the dSVI, so as to control the quantity of sludge under aggregate form greater than 200 μm and result in a control shift of the microbiome towards a controlled proportion of aggregates to obtain a desired dSVI.

Controlling the amount of raw influent going through the dense biomass aggregate production and/or sustaining unit 18 is a way to promote and adjust the growth of aggregate greater than 200 μm dense biomass forms (for example in the case of a feast zone (18) the control of feast famine gradient leading to the control of growth of aggregate forms).

Controlling the amount of WAS extracted in direct and by the external gravity-based selection allows to trim up or down the percentage of aggregate, thus the dSVI.

Using these two levers allows managing and controlling a partial granulation of activated sludge so as to establish a densified biomass, under the form of a consortium of AGS, dense aggregates and flocculated biomass as described above.

In the method of the invention, the dense biomass aggregate generating process 67 of step 104 of producing and/or sustaining a second part of dense biomass aggregates 171 may be performed in a dense biomass aggregate production and/or sustaining unit 18 fed by the underflow 16 and at least part of the raw influent 10, and optionally part of internal plant returns (68), and the produced second part of dense biomass aggregates 171 is aerobic granular sludge (AGS). The dense biomass aggregate production and/or sustaining unit 18, or feast tank 18, is advantageously aerated, anoxic or anaerobic.

The method of the invention may further comprise a step 108 of feeding the dense biomass aggregate production and/or sustaining unit 18 with an additional stream 19 comprising at least VFA and/or readily biodegradable carbons. This offers more substrate to aggregate forms to promote their growth. Controlling the amount of supplemental load to the feast zone 18 is an additional mean for controlling the dense biomass aggregate 171 growth, thus an additional tool to tune the SVI.

"Readily biodegradable carbons" are well known from the person of skill in the art. They are for instance defined in "Activated Sludge Models ASM1, ASM2 and ASM3", edited by the IWA task group on mathematical modelling for design and operation of biological wastewater treatment, Henze et al (2000), ISBN 1 900222 24 8. Examples of readily biodegradable carbons are volatile fatty acids. RBCs may be generated by fermentation, for instance as in the unified fermentation and thickening (UFAT) process, disclosed in particular in US Pat. No. 6,387,264.

"VFA" or "volatile fatty acids" are known in the art. They include lower carboxylic acids, notably $C_1$-$C_4$ saturated, linear or ramified hydrocarbon chains substituted by a COOH group, such as acetic acid, lactic acid, advantageously acetic acid.

The method of the invention may further comprise a step 109 of subjecting at least part of the activated sludge AS and/or at least part of the return activated sludge RAS and/or at least part of the underflow 16 to a fermentation, thereby producing a stream 20 comprising VFA; and a step 110 of feeding with at least a part of the stream 20 comprising VFA the dense biomass aggregate production and/or sustaining unit 18 and/or to the biological treatment. The fermentation may be a side stream enhanced biological phosphorus removal (S2EBPR) also known as "RAS fermentation". It aims at producing VFA from a side-stream biomass fermentation. The stream 20 may flow out in the feast zone 18 and/or in the biological treatment.

The method of the invention advantageously further comprises a step 111 of controlling the amount of activated sludge AS or return activated sludge RAS subjected to the fermentation step 109; and/or a step 112 of controlling the amount of the underflow 16 subjected to the fermentation step 109; and/or a step 113 of controlling the amount of the stream 20 containing VFA fed to the dense biomass aggregate production and/or sustaining unit 18, the remaining part of the stream 20 containing VFA being fed to the biological treatment. Controlling the amount of the stream 20 to the feast zone is a way to promote aggregate growth thus a way to adjust biomass densification (SVI).

Figure 5:
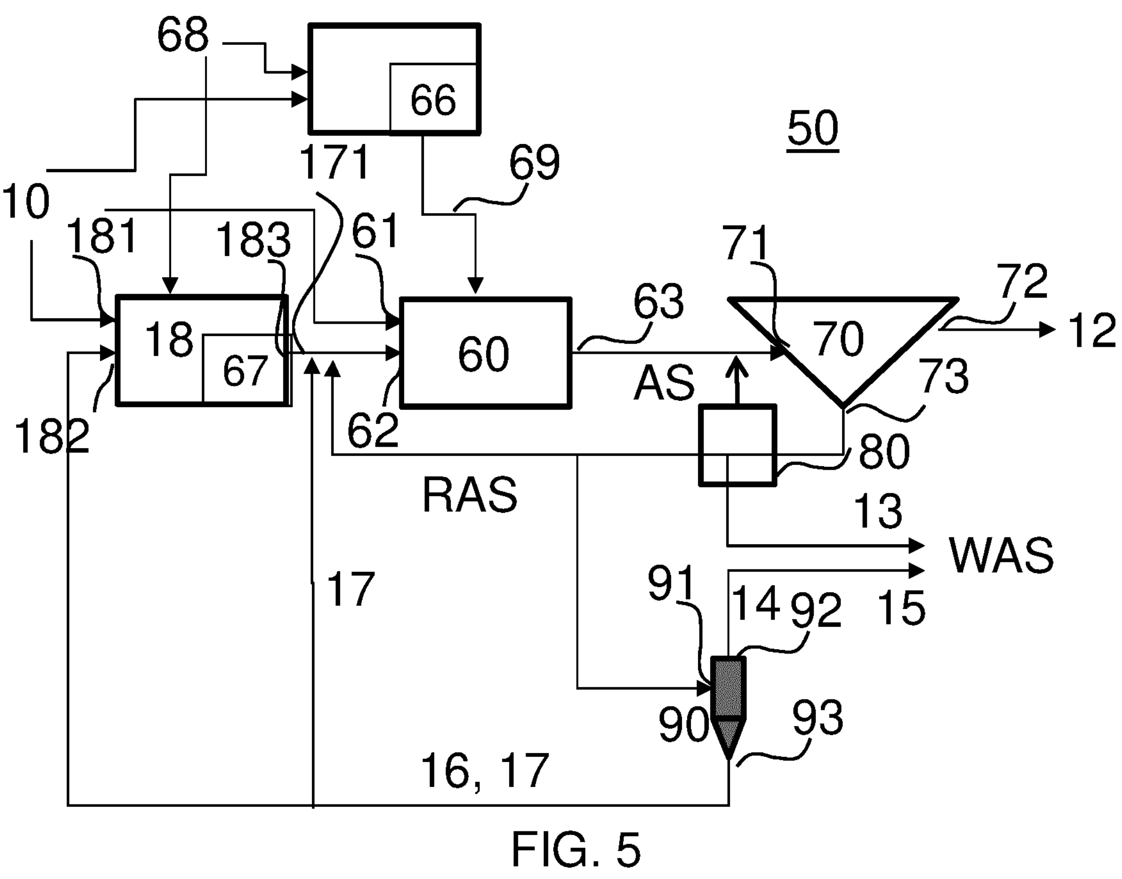

In the method of the invention, the dense biomass aggregate generating process 67 of the step 104 of producing and/or sustaining the second part of dense biomass aggregates 171 may be an aerated or aerobic biofilm-based process 66 (as depicted in FIG. 5) such as a Biological Filtration including Biological Aerated filtration (BAF), a Membrane Aerated Membrane Reactor (MABR), and/or a Moving Bed Biofilm Reactor (MBBR). The dense biomass aggregate generating process 67 is fed with at least part of the raw influent 10 and/or at least part of internal plant returns 68, thereby generating a biofilm biomass, said biofilm biomass excess being sloughed in the form of free suspended nitrifying biofilm 69 to the biological treatment process step 100.

In this case, the free suspended nitrifying biofilm 69 outputted from step 104 may be contained in the backwash of a Biological Aerated Filter (BAF) and/or in the output of Biological Aerated Filter (BAF) and/or in the output of a Moving Bed Biofilm Reactor (MBBR) and/or in the output of a Membrane Aerated Biofilm Reactor (MBBR). The Membrane Aerated Biofilm Reactor (MABR) may be placed side-stream of the biological treatment and/or within the biological treatment step 100.

When the dense biomass aggregate production and/or sustaining unit 18 is a contact or feast zone, a Membrane Aerated Biofilm Reactor (MABR) may also be placed within said feast zone being an anaerobic contact tank.

The dSVI variability (100-300 mL/g) observed in the prior art is a restrictive point that forces the practitioner to design clarifier with low SOR, because the most restrictive regime in terms of clarifier design is the peak flow combined with high dSVI and design MLSS (Mixed Liquor Suspended Solids) concentration. For temperate climate countries it usually happens in winter:

- In winter are observed the highest SVI value;
- In winter the highest MLSS value is needed in order to maintain nitrifying SRT (Sludge Retention Time).

This conjunction of conditions induces the lowest and most restrictive SOR using state of the art practices with usual SVI hypothesis around 120-180 ml/g.

The invention using densified sludge allows for a stabilized and controlled dSVI which results from the aforementioned controlled microbiome shift. The use of such technology can secure low SVI design hypothesis in the range of 40-100 ml/g at typical design MLSS of 4 g/L, thus enabling clarifier SOR designs in the range of 1.2 to 3.5 m/h, preferably between 1.6 to 3.2 m/h. Such SOR are well above current design practices, especially in France which are limited to a maximum of 0.8-0.9 m/h. Furthermore, ATV guidelines cap the maximum SOR of a clarifier between 1.6 to 2.0 m/h. The invention allows to tune the SVI of the biomass. As a consequence, when the separation step is a clarification step, the invention makes it possible to design clarification step outside the commonly accepted boundaries of the man skilled in the art.

The controlling steps 106, 107, 111, 112, 113 are configured so as to maintain a densified biomass having:

- a dSVI between 35 and 100 ml/g, preferably between 40 and 70 ml/g, and/or
- more than 10%, typically between 15% and 70% of particles with a particle size of between 100 μm and 1000 μm, and/or
- a dSVI30/dSVI10 ratio comprised between 70% and 95%, preferably between 70% and 85%.

Advantageously the densified biomass has between 15% to 50% of particles with a particle size greater than 200 μm (such as between 200 μm and 500 μm).

Preferably the densified biomass has between 20% and 40% of particles with a particle size greater than 200 μm (such as between 200 μm and 500 μm).

When step 101 of separation is operated in a clarifier, it may be operated with:

- A thickening performance achieving a solids concentration between 20 to 30 g/L at the bottom of the clarifier;
- A RAS rate of ca. 30 to 60% of the influent flow-rate;
- An upflow velocity (SOR) comprised between 1.0 and 4.0 m/h, preferably 1.6 to 3.2 m/h;

A surface load rate comprised between 8.5 and 33.8 kgMLSS/m$^2$/h, preferably between 10 and 22 kgMLSS/m$^2$/h;

A clarifier designed for ca. 10% less depth and 20% less volume compared to conventional design;

An aeration tank designed for 30 to 40% smaller volume compared to conventional design.

Alternatively, step (101) of separation may be operated as an MBR membrane separation advantageously operated with:

reduced frequency of maintenance cleaning cycles of the polymeric membranes wherein maintenance cleaning cycles are consistently and significantly reduced together with reagent consumption to a frequency of once a week or below without shortening the membrane life time, and/or applying an annual average filtration net flux fostered consistently above 30 $L \cdot m^{-2} \cdot h^{-1}$ at 20° C. (also abbreviated lmh) with state-of-the-art cleaning frequency without shortening the membrane lifetime.

The densified sludge obtained by the method of the invention is positioned outside the definition of granular sludge and CAS. Based on these characteristics of the obtained densified sludge, the invention enables to optimize the design of wastewater treatment plants and processes.

Figure 3:
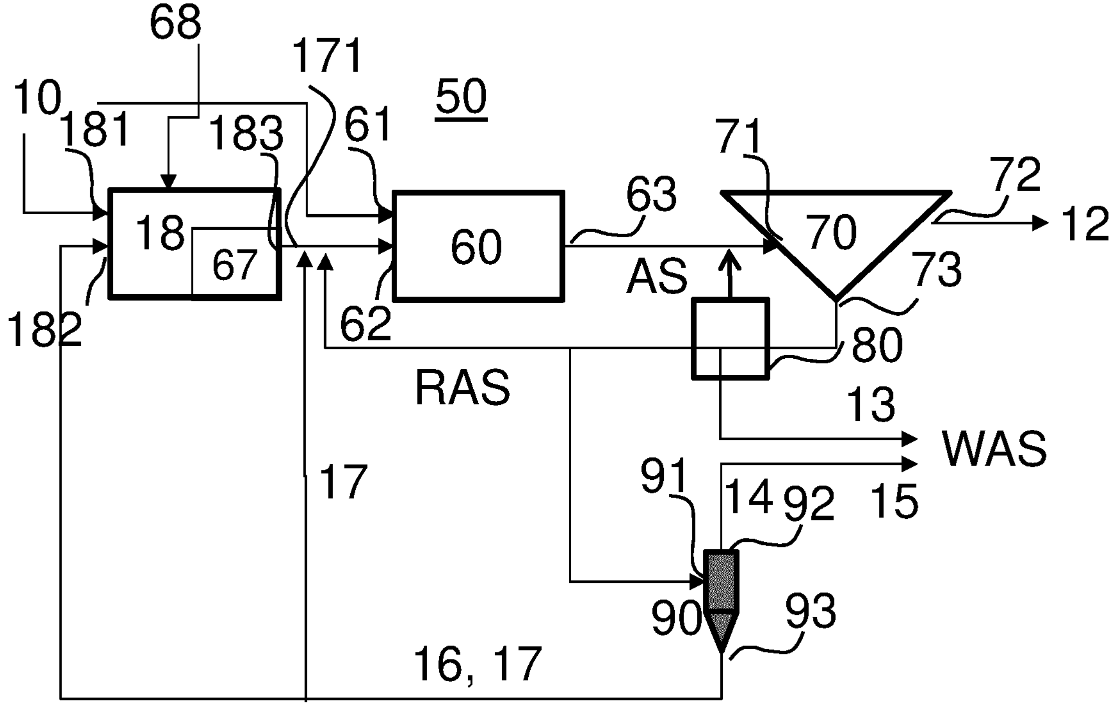
FIGS. 3 to 8 schematically represent different embodiments of installations according to the invention.

FIG. 3 schematically represents an embodiment of an installation 50 according to the invention. The installation 50 for controlled biomass densification in a biological treatment of a raw influent 10 comprises a biological tank 60 containing free suspended biomass having a first inlet 61, a second inlet 62 and a first outlet 63, the biological tank 60 being configured to be fed at the first inlet 61 with at least a part of the raw influent 10 and return activated sludge RAS to produce a mixture of treated water and activated sludge AS recovered at the first outlet 63. The installation 50 comprises a separation unit 70, having a first inlet 71, a first outlet 72 and second outlet 73, the separation unit 70 being configured to be fed at the first inlet 71 with the activated sludge AS and to produce an effluent 12 recovered at the first outlet 72 and a return activated sludge RAS recovered at the second outlet 73. The separation unit 70 may be a membrane or clarifier, preferably a sedimentation system such as clarifier, optionally lamella. The separation unit 70 may also be a filter or a floatation unit, such as a dissolved air floatation (DAF). The installation 50 comprises an extracting device 80 configured to extract at least part of the return activated sludge RAS and/or part of the activated sludge AS as a first source 13 of a waste activated sludge WAS. The installation 50 further comprises an external gravity-based selector 90 having a first inlet 91, a first outlet 92 and a second outlet 93, the external gravity-based selector 90 being configured to be fed at the first inlet 91 by at least part of the return activated sludge RAS and/or part of the activated sludge AS and to generate an overflow 14 intended to be extracted at the first outlet 92 as a second source 15 of the waste activated sludge WAS and an underflow 16 comprising dense biomass aggregates 17 recovered at the second outlet 93. The external gravity-based selector 90 may be for example a hydrocyclone. The installation 50 comprises a dense biomass aggregate production and/or sustaining unit 18 having a first inlet 181, a second inlet 182, a third inlet 185, and a first outlet 183, the dense biomass aggregate production and/or sustaining unit 18 being configured to be fed at the first inlet 181 with at least a part of the raw influent 10 and optionally at the second inlet 182 with the underflow 16 and to form the second part of dense biomass aggregates 171 such as aerobic granular sludge AGS or biofilm recovered at the first outlet 183. The biological tank 60 is further configured to be fed at the second inlet 62 with the dense biomass aggregates 171 and at least part of the recovered dense biomass aggregates 17 from the underflow 16, thereby obtaining a consortium of dense biomass aggregates in the form of aerobic granular sludge AGS and/or biofilm and activated sludge, said mixture constituting the densified biomass.

The dense biomass aggregate production and/or sustaining unit 18 can be a single unit, or multiple units in series or parallel, tributary or distributary. The unit 18 can be a contact zone (which may be regarded as a "feast" zone in the sense that it allows both to produce and sustain the dense aggregates of the biomass), optionally comprising a MABR. Alternatively, the unit 18 can be a MBBR, a trickling filter, a biofilter (such as a BAF: Biological Aerated Filter), an IFAS, a RBC (Rotating Biological Contactor), or biodisc.

The underflow 16 junction to second inlet 182 is sometimes not used (i.e. the unit 18 is not fed with underflow 16), especially when the dense aggregate production unit 18 does not let the recovered dense biomass aggregate 17 pass through (like in the case of a biological filter or trickling filter.

The processes to generate the dense biomass aggregates may be:

An upfront contact tank (in anaerobic, anoxic or oxic conditions), to promote feast famine cycles that induce aggregation/granulation;

A biofilm process (which can be of different types) that generates biofilm detachments of any organism type, and preferably nitrifying biofilm;

Or any combination thereof.

The seeded dense biomass aggregates are selectively retained by a selector to further enrich the biological treatment system. The mixture of aggregates and flocculated biomass present in the biological system is defined as densified sludge. The selector overflow waste out preferentially the activated sludge flocculated biomass.

The external selector may be a hydrocyclone, a centrifuge, a settling device, a filter, a screen, a sieve, a classifier or a lamella.

The size of the dense biomass aggregates in the biological treatment mixed liquor can further be constrained in a relatively small aggregates size (100-500 μm, preferably 200-500 μm) as compared to AGS process (1 to 2 mm) thanks to the shear stress applied on the biomass while passing through the selector when the selector is an hydrocyclone. This has an advantage in terms of ballasting effect of the aggregates and flocculated sludge mixture because, for a given mass percentage of aggregate, the ballasting effect is enhanced when the mass of aggregates is dispatched within numerous small dense aggregate particles rather than in a limited number of much higher size dense particles. The use of the hydrocyclone as the selector thus helps to control the size of aggregates in smaller ranges than otherwise obtained with sieves for example.

The control of the proportion of influent processed in the dense biomass aggregate production unit(s) 18 enables to increase or decrease the aggregate seeding effect to the biological treatment.

The control of the proportion of WAS extracted from the direct WAS extraction 13 and from selector overflow 14 (e.g. WAS source repartition) enables to waste out dense biomass aggregates in a controlled manner.

The use of those two controls enables to control the proportion of dense biomass aggregates within the biological system suspended biomass, so as to obtain the densified biomass which is defined as a consortium of flocculated biomass and dense biomass aggregates.

The installation of the invention leads to a controlled shift of biomass microbiome for bioaugmentation of dense bio-aggregates through external gravity-based selection in free suspended biomass system with partial granulation. The controlled shift is advantageously performed from values lower than 20% to 15-50% aggregate, preferably 20-40% aggregate in a controlled manner.

Figure 4:
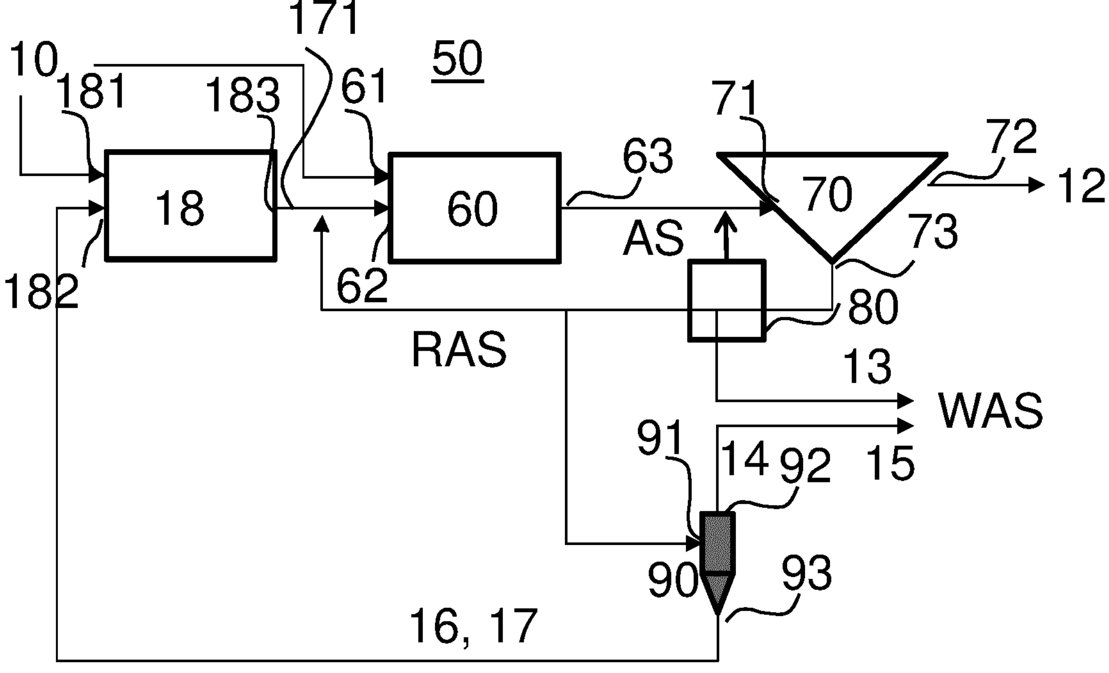

FIG. 4 schematically represents another embodiment of the installation 50 according to the invention. In this embodiment, the dense biomass aggregate production and/or sustaining unit 18 is a feast zone. The feast zone 18 enables to contact selector underflow (16) containing higher size microbial forms with part or totality of the raw influent 10 and optionally part or totality of internal plant returns (68), in order to promote granulation. The preferential growth of aggregate is greater than 100 μm. The Feast zone is configured to contact recovered dense biomass aggregates (17) (or precursors thereof) from the underflow (16) with (preferably undiluted) raw influent (10), optionally with internal plant returns (68), to induce a high substrate gradient, penetrating deeply into dense aggregate form. The subsequent alternation of feast zone (18) and biological tank (60) induces a feast—famine to the aforementioned biomass, resulting in the preferential growth of organism being able to store some substrate during the feast period, thus inducing aggregation/granulation. The fact that the invention only directs the denser biomass forms (aggregates of precursors to it) in the feast zone 18 induces even more preferential growth of aggregate forms since these are the only one subjected to the feast-famine periods.

FIG. 5 schematically represents another embodiment of the installation 50 according to the invention. In this embodiment, a biofilm-based process is added to enrich the system in aggregate forms by sending the excess growth of biofilm into the biology (60). The dense biomass aggregate generating process 67 of the step 104 of producing and/or sustaining dense biomass aggregates 171 is an anaerobic, anoxic, or aerated or oxic biofilm-based process 66 such as:

- Biological Filtration including Biological Aerated filtration (BAF), or Biological anoxic filtration,
- Membrane Aerated Membrane Reactor (MABR),
- Moving Bed Biofilm Reactor (MBBR),
- Trickling filter,
- Rotating Biological Contactor (RBC) also known as bio-disc, wherein the dense biomass aggregate generating process 67 is fed with at least part of the raw influent 10 and/or at least part of internal plant returns 68, thereby generating a biofilm biomass, said biofilm biomass excess growth being sloughed in the form of free suspended biofilm 69 preferably nitrifying or denitrifying or anaerobic biofilm (therefore forming aggregates), preferably nitrifying biofilm, to the biological treatment process (60) of step 100.

In this embodiment, a side stream or mainstream biofilm production unit is added to the system in order to produce additional dense biomass in the form of free suspended biofilm that are intended to be seeded to the main biological treatment system to further enrich the densified biomass mixture with dense biomass aggregate.

As mentioned above, the biofilm production unit may be a membrane aerated bioreactor (MABR), a moving bed bio reactor (MBBR) or a biological aerated or anoxic filter (BAF), a trickling filter, a bio-disc (in particular rotating bio-disc), any form of embedded or ballasted biofilms, preferably a MABR.

The biofilm production unit may be fed with part of the influent 10, optionally with internal plant returns 68 such as sludge line returns, that may contain high ammonia level in case the sludge line features anaerobic digestion and/or advanced sludge treatment such as for example hydrothermal carbonization, thermal hydrolysis process, etc.

The biofilm production unit (66) processes the fed pollution inducing a biofilm growth. The biofilm in excess eventually detaches from the growing media by itself (like MBBR does under aerated condition) or under a specifically dedicated action (like scouring the aeration membranes in MABR process, or backwashing in BAF process).

The excess biomass 69 produced by the biofilm production unit is then leaked out at the outlet (or intentionally backwashed in the case of BAF) into the biological tank 60.

In the proposed embodiment, the nitrifying biofilm flakes 69 detached from the biofilm production unit are collected and seeded into the biological tank 60, where it incorporates with the biological sludge, to further enrich it in dense free suspended biofilm aggregates that are to be considered as dense biomass aggregates.

When using a biological aerated filtration (BAF), fed with low carbon and high ammonia containing liquid like primary treated wastewater influent or digestion centrates, the BAF produces some nitrifying biofilm which is further seeded in the main biological system. An MABR process produces also a majority of Nitrifying biomass. The MBBR also creates some nitrifying biomass thanks to the long biofilm retention time onto the medias. The optional use of warn internal plant returns (68) such as anaerobic digestion centrates or deammonification plant outlet also brings some temperature advantage to grow easily some nitrifying biofilm.

Thus, using any of the aforementioned biofilm production processes (66), the mainstream biological system enriches its nitrification biomass inventory from being seeded with the produced excess biofilm. Furthermore, the seeded nitrifying biofilm flakes being in nature of higher size particles and/or denser than CAS biomass, it can be retained preferentially at the external gravity-based selector underflow 16. These two combined actions magnify synergistically, as a small nitrifier seeding flux can consolidate over time to enrich progressively the system in nitrifying dense biomass aggregates. The dense or higher size nitrifying aggregate may further grow and develop while nitrifying some ammonia within the biological system.

In this embodiment, the feast zone (18) is optional, and can add a synergistic sustaining effect for the microbiome shift of nitrifying organisms onto the dense biomass aggregates. In a specific realization of this embodiment, the dense nitrifying aggregates created by the nitrifying biofilm production unit, and further enriched with the synergistic effect of the external gravity-based selection are collected in the underflow 16 and further contacted in an aerated feast zone (18) with at least part of plant internal returns 68 containing high concentration of ammonia (specifically anaerobic digestion centrates or effluent from a sidestream deammonification process), and preferably without any raw influent 10 fed to the aerated feast zone 18. While this selected stream of nitrifier aggregates benefits from the rich ammonia substrate, it also outselects the OHO from the biofilm aggregates, the result being an enrichment of nitrifier population within the dense aggregate forms. This can enable to maintain/sustain the nitrifying population in the system while reducing the amount of raw influent and/or internal return processed in the biofilm production unit. The sustaining effect can help to maintain the same inventory of nitrifying biomass in the system biomass, while reducing the seeding effect from the nitrifying biofilm production unit.

The fact that nitrifier can be instated, grown and maintained in high proportion in/on the dense aggregate biomass form can also unlock some interesting technical effect thanks to the uncoupling of nitrifiers sludge retention time (SRT). Indeed, in such presented system, the nitrifying sludge preferentially grown within/onto the dense biomass aggregate can be kept for a much longer sludge retention time in the system than the flocculated activated sludge, because the mixture of dense nitrifying aggregate and activated sludge can undergo strong selective extraction: while extracting WAS in priority from the selector overflow 14 the flocculated activated sludge is preferentially washed out of the system while the recovered nitrifying biomass aggregates 17 in the underflow 16 are preferentially retained in the system. This results in the flocculated biomass having a lower sludge retention time in the system, while the aggregated biomass remains for a longer time in the system. The SRT uncoupling of these two biomass results in advantages for the global biological treatment system: firstly, the flocculated activated sludge SRT is reduced as compared to the system apparent average SRT, which results in younger biomass having higher pollution degradation kinetics (for carbon oxidation and denitrification purpose). The flocculated biomass aerated SRT may be purposely designed to be maintained very low, thus below the nitrifier wash-out threshold for a given operational temperature range, so the flocculated biomass is not including any nitrifiers, but has younger OHO performing with high kinetic rates. On the other hand, the aggregates originally contain nitrifiers, which can further develop because aggregates reside much longer in the system. The aggregates aerated SRT is thus purposely designed to a higher aerated SRT than required for nitrification, so as to instate, bio-augment and sustain a sufficient nitrifier inventory in the biological system. A similar approach can be considered by maintaining a higher anoxic SRT purposely designed to a higher anoxic SRT than required for classical (or ordinary) heterotrophic denitrification, so as to instate, bio-augment and sustain a sufficient slow-growing heterotrophic or autotrophic (such as anammox, DAMO or methylotrophs) denitrifier inventory in the biological system. Finally, a similar approach can be considered by maintaining a higher anaerobic SRT purposely designed to a higher anaerobic SRT than required, so as to instate, bio-augment and sustain a sufficient slow growing hydrolytic (substrate particle breaking or enzymatic), fermentative or any such organisms in the biological system. The fact that the invention can uncouple the SRTs of OHO flocculated biomass and for instance nitrifier biomass onboard aggregates enables the treatment tank to still nitrify with an apparent SRT below the nitrifier wash out threshold, allowing for designing compact volume as compared to CAS-BNR (Biological Nutrient Removal) or state of the art IFAS (integrated fixed film activated sludge): CAS-BNR does not benefit from seeding nor selective retention of the nitrifiers, and IFAS only benefit from the seeding effect of it fixed-film part, but cannot consolidate nitrifying inventory while designed to low in aerated SRT because it lack the selective retention.

The uncoupling of SRT and/or growth rate between organisms can be across a continuum of selected particles, as the underflow 16 of a selector 90 will retain larger and more dense particles compared to the overflow 14. This approach can create multiple niches for organisms with the highest growth rate in the smallest of particles with the lowest substrate gradient characteristics (as characterized by Fick's Law of diffusion) and the organisms with slower growth rates to be located in the largest of particles with the highest substrate gradient characteristics. A feature of the invention is to control and optimize the selection for specific organism groups to function at or near their highest activity. For example, the maximum specific growth rate of ordinary heterotrophs is approximately 5 day−1 and the growth rate of nitrifiers is approximate 1 day$^{-1}$. An uncoupling of SRTs can be achieved to optimize niches for the smaller or lighter particles (such as flocs) for faster growing heterotrophs and for the larger aggregates of granules for slower growing nitrifier, thus creating a 1:5 SRT or growth rate uncoupling ratio. This uncoupling ratio can be modified by adjusting the selection pressure in a selector device (such as clarifier, hydrocyclone, centrifuge, lamella or classifier) to a low ratio of 1:2 to a high ratio of 1:10, with a typical ratio closer to 1:5. The augmentation of biomass sloughed from biofilms such as MABR that is integrated into the process can further modify or increase this ratio to 1:20 or greater. For example, organisms of high growth rates can be supported in flocs using the lowest SRT (such as 1 to 5 days at 20° C.), organism with medium growth rates can be supported in granules or dense aggregates with medium SRT (such as 5-25 days at 20° C.) and the organisms with slowest growth rates can be supported in biofilms (attached and sloughed) in a ratio such as 1:5:20. Other ratios can be 'dialed in' as needed through biofilm management approaches. The advantage of maintaining different optimized SRTs based on organism growth rates helps with maintaining the highest active fractions thus accumulating less decay products including inert and endogenous debris within the inventory for the fast growing organisms while encouraging the proliferation of often very slow growing 'efficient' organisms (such as nitrifiers, anammox, denitrifying anaerobic methane oxidizers (DAMO) or micropollutant degraders). The maintenance of highest 'active inventory' through SRT gradation or SRT uncoupling strongly assists in process intensification as well as process resilience. Examples of uncoupling could include optimized supporting conditions for growth of heterotrophs at 5 day$^{-1}$, nitrifiers at 1 day$^{-1}$ and anammox or DAMO at 0.2 day$^{-1}$ or even lower, thus creating uncoupling ratios for example of 1:5:25. Other ratios are also possible, and these uncoupling approaches are a representative feature of our invention. The SRT uncoupling controlling step may be performed based on mass split, flow split, and/or particle retention efficiency adjustments at the selector. The apparatus approach for this uncoupling is through the automatic or manual adjustment of selection pressure in a device by changing the efficiency of selection of larger versus smaller particles. For example, this adjustment of selection pressure could be achieved by changing the nozzle in a hydrocyclone, its midsection, or the vortex finder in its influent section; or by changing the differential rpm (revolution per minute), G force, torque, or the pond depth, or the beach angle in a centrifuge; or by changing the hydraulic retention time or loadings of a classifier or lamella. Adjustment of selection pressure can also be achieved by including multiple (two or more) devices in series, parallel, as tributaries or as distributaries. When the term nitrifier is used, other organisms are also possible (such as denitrifiers or anaerobic organisms) and when the term oxic or aerobic is used, other conditions are also possible (such as anoxic or anaerobic). It should be noted that the SRT requirements typically increase with a decrease in water temperature and decrease with increase in water temperature, roughly in line with Arrhenius described temperature dependency.

Figure 6:
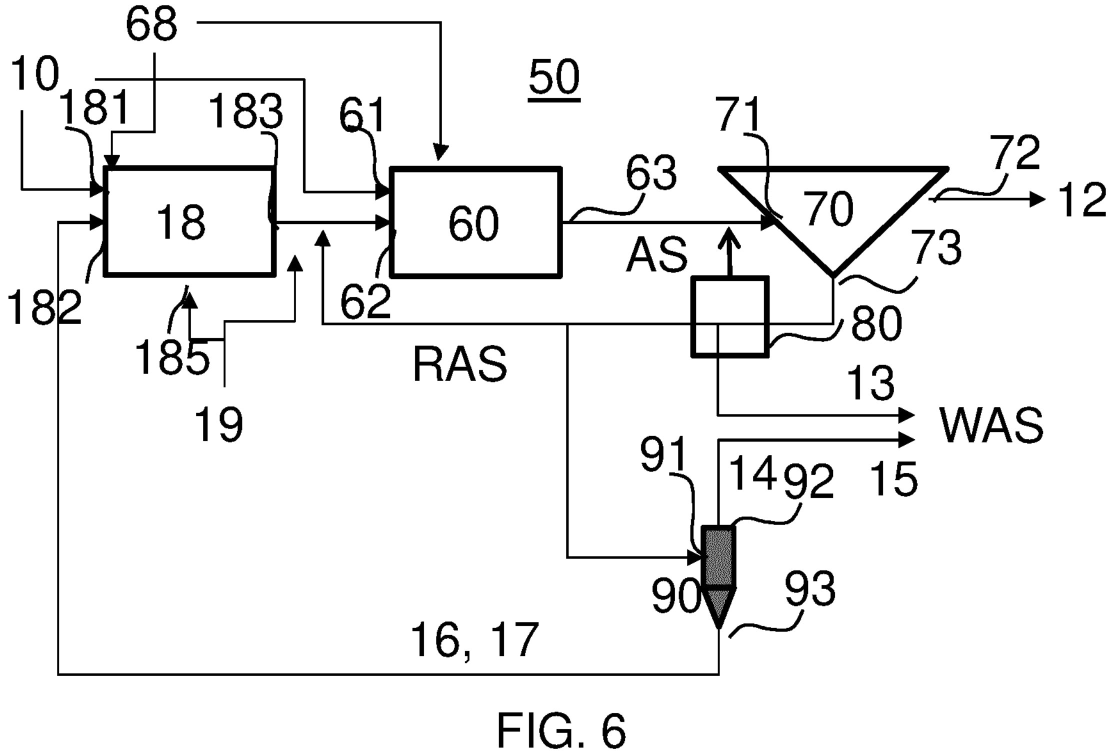

FIG. 6 schematically represents another embodiment of the installation 50 according to the invention. In this embodiment, the dense biomass aggregate production and/or sustaining unit comprises two units in series. One of these units is a feast zone 18, preferably anaerobic. Said feast zone 18 is further configured to be optionally fed at the third inlet 185 with an additional stream 19 comprising at least VFA and/or readily biodegradable carbon. Additionally, a second dense biomass aggregate generating process 67 of step 104 of producing and/or sustaining dense biomass aggregates 171 may be an aerated biofilm-based process 66 such as a Membrane Aerated Membrane Reactor (MABR), a Moving Bed Biofilm Reactor (MBBR).

As known in the art, a MABR implemented in an anoxic or anaerobic environment can be used for simultaneous nitrification and denitrification in a single compact reactor.

In this embodiment, the installation comprises an MABR as the generating process (66) for nitrifying biofilm (69), and an anaerobic feast zone 18 as a generating process (67) for dense biomass aggregate (171) to promote the aggregation of biomass, in particular EBPR biomass (Enhanced Biological Phosphorus Removal).

The MABR membrane(s) may be directly installed in the anaerobic feast zone 18, giving a compact installation with one tank assuming two functions, which have synergistic advantage. The biological treatment is preferably A2O or AO. In this embodiment, the advantages are:

- MABR can provide to the system some nitrifying biofilm biomass;
- Feast Anaerobic zone induces aggregation/partial granulation with some production of EBPR biomass (PAO and DPAO biomass) aggregates;
- MABR can, with some specific sequenced aeration controls, provide some EBPR biomass.

And the hydrocyclone/selector retains all of these dense aggregated biomasses in the system via its selective biomass separation, aggregate retention and subsequent wastage of the flocculated biomass.

As previously described in previous embodiments, the control of dense biomass aggregate percentage in the system can be modulated by:

- Increasing the quantity of influent 10 and/or internal plant returns 68 processed in the Feast zone 18;
- Manage the aggregate wastage by the repartition of the WAS being done from direct extraction 13 and the WAS extracted from the selector overflow 14 as a second source of WAS 15.

Additionally, in this embodiment, the modulation of a continuous aeration rate in the MABR membranes can be a control point to produce more or less nitrifying biofilm.

If needed, the concentration of ammonia can be risen locally in the Feast tank 18 where the MABR membranes are installed to promote higher nitrification kinetics and thus maximize the nitrifying biofilm production.

A further synergistic effect in this configuration is obtained through the feast zone 18 performing simultaneous nitrification/denitrification reactions on the MABR membranes biofilm.

In an alternative operation of the MABR, the aeration membranes are alternatively subjected to aeration (full aeration or micro-aeration more than 2 hours) and non-aeration (1 to 3 hours). Being placed in a feast zone 18, the medium, contains phosphorus pollution from the influent 10 and the internal returns 68 as well as fresh VFA from the influent or further added in the third input 185 by introducing a stream 19 containing VFA (such as external dosage or S2EBPR outlet).

Alternating aerobic and anaerobic conditions to the biofilm growing on the MABR membrane will in this specific operation promote the formation of some EBPR biomass (PAO for Phosphorus Accumulating Organisms and DPAO for Denitrifying Phosphorus Accumulating Organisms) that will further seed the downstream biological system. The formed EBPR aggregated biomass, produced both by anaerobic feast tank and MABR specific operation, can further grow and develop in the downstream biological treatment being configured as A2O or AO with S2EBPR variant.

As compared to CAS EBPR processes, the embodiment is more resilient in terms of EBPR, in particular during intense and long rainfall events, and/or winter period associated with low wastewater temperature. Indeed, in the embodiment, the part of EBPR biomass enclosed in the dense biomass aggregate is selectively retained by the external density-based selector thus limiting the EBPR biomass inventory decay to the part being linked to the flocculated biomass.

The present embodiment thus allows for multiple control points to uncouple several SRTs in the system:

- OHO in the flocculated biomass maintained at low SRT to maximize its kinetics;
- Nitrifiers in the aggregated dense biomass maintained at high SRT to maintain nitrifying inventory in a biological system designed with low aerobic SRT that would otherwise not being able to nitrify;
- EBPR biomass in the dense biomass aggregates is maintained in a medium SRT range, preferably one third away from the OHO, to maintain some EBPR biomass inventory.

The SRT uncoupling provided by the combination of seeding of nitrifier biomass from MABR and selective retention at the selector enables to design the biological tank aerobic SRT below the known integrated fixed film activated sludge (IFAS) guidelines (MABR being an IFAS) without impairing nitrification.

In this embodiment, the biological system aerobic SRT can be further reduced, since the nitrifier biomass SRT is uncoupled from the system apparent SRT. Indeed, as opposed to state of the art IFAS, where the amount of medias (including MABR membrane surface) drives the quantity of nitrifier in the system, thus the final nitrification performance for a given aerobic volume, the invention provides a new way to shift the microbiome to higher amounts of Nitrifiers regardless of the proportion MABR membrane media, providing a compact system with reduce cost in term of MABR membranes.

In a variant, the MABR membrane can be placed in the biological tank 60, preferably in the anaerobic zone or anoxic zone, and the MABR membrane could also be maintained in the anaerobic feast zone 18 but not necessarily. Such variant allows to obtain a more compact installation.

Also, the anaerobic or anoxic zone of the biology can perform, thanks to the MABR, some simultaneous Nitrification/denitrification, thus optimizing the system volume. Further nitrifier seeding effect into the densified sludge mixture can be obtained with both MABR in aeration. Alternatively, a first MABR located in the feast zone 18 can provide some EBPR biomass while a second MABR located in the biological tanks 60 supports nitrification biomass.

In this variant, combining the seeding of nitrifying suspended bioliflm 69 produced in by the aerated biofilm-based process and its selective retention effect by the external gravity based selection step 103 allows for the biological treatment 100 fulfills the complete nitrification of the raw influent 10 with an aerated SRT below the state-of-the-art CAS nitrifier wash out limit and below the known IFAS complete nitrification requirement (see Houwelling Dwight & Daigger Glen T.—intensifying Activated Sludge Using Media-Supported Biofilms. CRC press, 2020 ISBN 978-0-367-20227-9).

Figures 7, 8:
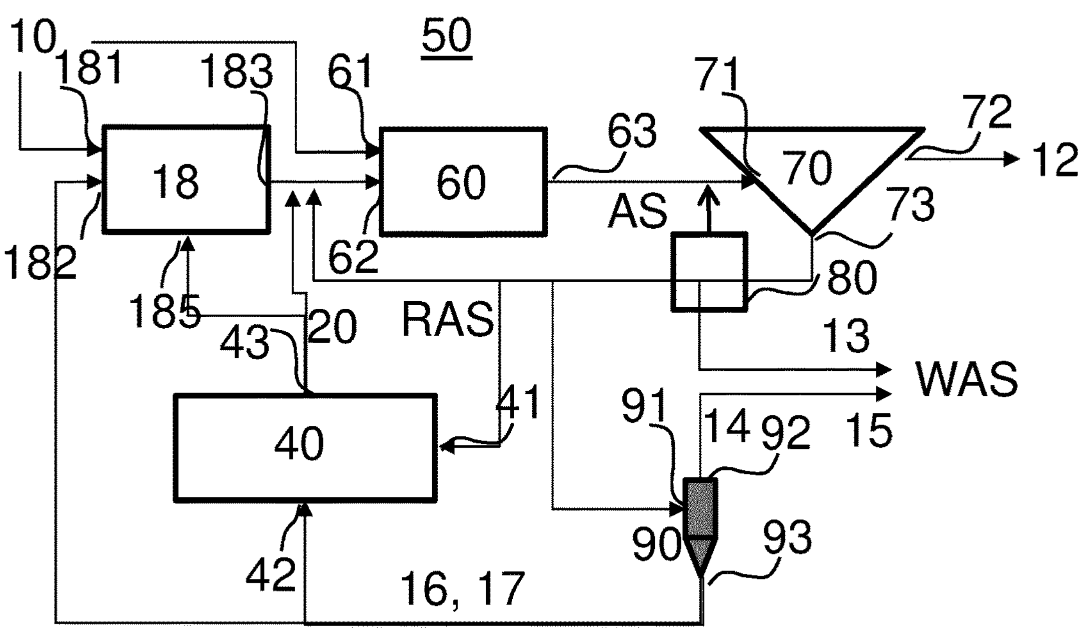

FIG. 7 schematically represents another embodiment of the installation according to the invention. In this embodiment, the installation 50 further comprises a fermentation tank 40 having a first inlet 41, a second inlet 42 and a first outlet 43, the fermentation tank 40 being configured to be fed at the first inlet 41 with at least part of the activated sludge AS and/or at least part of the return activated sludge RAS and/or at the second inlet 42 with at least part of the underflow 16, and to produce a stream 20 comprising VFA recovered at the first outlet 43, the feast zone 18 being configured to be fed at the third inlet 185 with the stream 20 comprising VFA and/or the biological tank 60 being configured to be fed at the second inlet 62 with the stream 20 comprising VFA.

The fermentation tank 40 may be a side stream enhanced biological phosphorus removal (S2EBPR), implemented to produce VFA from side-stream biomass fermentation. The S2EBPR outlet may flow out in the feast zone 18 and/or the biological tank 60. The S2EBPR may be fed by at least part of the underflow 16.

Controlling the proportion of the stream 20 containing VFA form the outlet 43 of the S2EBPR 40 to the feast zone 18 is a way to promote aggregate growth, and thus a way to adjust biomass densification.

FIG. 8 schematically represents another embodiment of the installation 50 according to the invention. In this embodiment, the installation 50 further comprises a controller 184 of the amount of the raw influent 10 fed to the feast zone 18. The installation 50 may further comprise a controller 131 of the amount of the waste activated sludge WAS extracted from the first source 13 of the waste activated sludge WAS and/or from the second source 15 of the waste activated sludge WAS.

Advantageously, the installation 50 comprises a controller 151 of the amount of activated sludge AS or return activated sludge RAS fed at the first inlet 41 of the fermentation tank 40; and/or a controller 152 of the amount of underflow 16 that is fed at the second inlet 42 of the fermentation tank 40, and/or a controller 153 of the amount of the stream 20 containing VFA fed at the third inlet 185 of the feast tank 18, the biological tank 60 being configured to be fed at the second inlet 62 by the remaining part of the stream 20 containing VFA.

The technical effects and advantages of each part of the installation were already discussed previously in connection with the method according to the invention and are not discussed here again.

When operating, the following levers may be adjusted:

- percentage of aggregates which is easily obtained by sieving with a 200 μm sieve a known volume of mixed liquor, measuring the retained suspended solids, or deducing it by subtracting the sieve filtrate to the initial suspended solids. The obtained concentration of aggregates greater than 200 μm is then divided by the initial sample MLSS concentration to obtain the percentage of aggregates in the mixed liquor;
- SVI and dSVI normalized analysis as described in European standards n° EN 14702-1.

If the percentage of aggregates is drifting down or if dSVI is drifting up because of seasonal variation of environmental conditions, it is possible to compensate this drift by:

- reducing the amount of WAS extracted in direct (e.g. do more WAS extraction via the external gravity-based selector), and/or
- introducing a higher amount of raw influent 10 and/or internal plant returns (68) and/or VFA containing stream(s) (19) (20) through the feast zone 18.

These actions will favor the retention and growth of aggregate.

Stopping direct extraction from the first source (13) can also be a response to dSVI reaching high values, that could for instance disturb clarifier outlet quality.

On the contrary, when the seasonal environmental conditions naturally favor the growth of dense aggregates, the proportion of WAS extracted via the external gravity-based selector overflow can be reduced, and the part extracted in direct can be increased. This variant is advantageous in terms of energy-saving, in particular when the external gravity-based selector is a hydrocyclone fed at higher pressure than direct WAS extraction. Reducing the raw water proportion going to the feast zone (18) may be an alternative or additional way to reduce temporarily the aggregate growth rate, until the desired proportion of aggregate (and corresponding dSVI) is obtained.

The invention thus offers several levers to dynamically adjust the level of biomass densification, for instance depending on the environmental and biological conditions.

Figure 9:
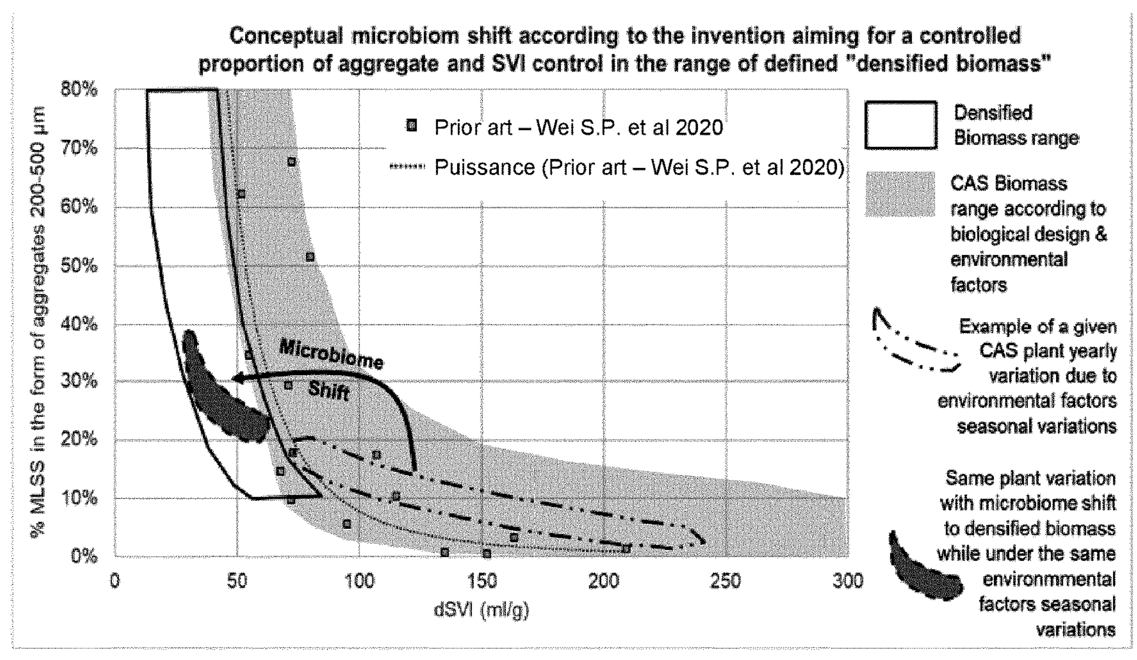
FIG. 9 is a conceptual diagram showing the microbiome shift obtained with the method of the invention, with corresponding operational variation boundaries with comparative CAS method.

FIG. 9 is a conceptual diagram of microbiome shift for a given plant, and illustration of CAS and densified sludge operational variation boundaries in terms of dense biomass aggregates proportion in the sludge and resulting dSVI.

As already explained, a given CAS plant has a certain pattern of aggregates percentage and SVI variation over the year. The vertical placement of this pattern owes to the "biological design factors" as illustrated by the "grey square" plotted point of prior art (Wei et al. 2020) which shows different plants (e.g. WWTP with different "biological design factors") at a given sampling time.

The rather horizontal (or up-left down-right slopped) variation owes to the variation of "environmental conditions". This variation is suffered by the plant, which according to the biological design and wastewater raw water quantities and quality variation can or not suffer bulking (uncontrolled rise of SVI, due to the overdevelopment of filamentous organism). Bulking (right corner of the dark CAS variation area on the right-hand side of the figure) can therefore arise from environmental and combined operational factors, and unless specific chemical treatment like shock chlorination are undergone, the sludge SVI uncontrolledly deviates to high values in unfavorable conditions. The extent of SVI drift in unfavorable conditions can be different one year from another according to operational history and climatic variations.

With the implementation of controlled wastage of excess sludge (WAS) via an external gravity-based selection, the microbiome may be shifted toward the left corner and beyond of the normal yearly variation that would occur in CAS. It results in controlled yearly dSVI variations round or better than the best yearly operational variation undergone in normal CAS operation. An example of CAS normal range of variation according to "biological design factors" and "environmental factors" is outlined in the "double dotted dash line area" on the right-hand side of the figure.

Densified biomass thus allows to smooth out yearly variations due to environmental factors, changing the biomass ability to settle.

EXAMPLE

Experimental Set Up

With a nominal capacity of 400,000 PE (People Equivalent), the WWTP (Waste Water Treatment Plant) on which the full-scale demonstration unit was installed comprises:

- A classic pretreatment: coarse screening (40 mm), fine screening (6 mm), grit and grease removal,
- A secondary biological treatment step, distributed over 4 identical independent lines, each composed of a biological basin in anaerobic configuration+sequenced channel, and an associated clarifier,
- Sludge treatment consisting of thickening on drip grids followed by dehydration by centrifuges.

The WWTP's biological treatment lines are totally independent of each other, thus without any mixing of the activated sludge upstream of the clarifiers or at the level of recirculation (RAS).

The scope of the study covers two independent lines of biological treatment, one called a "control line" (Ltem); the other, equipped with microbiome shift densification technology, as per the embodiment of FIG. 4, known as "densified line" (Ldens). These two biological lines, originally identical, therefore have the exact same biological design factors. Each have a contact zone or "pre-denitrification zone" in which the pretreated raw water and the RAS are mixed. The mixture then passes through an anaerobic agitated zone, then through a circular sequenced aeration ditch fitted with fine bubble aeration diffusor and banana blade mixers. The output of the biological treatment falls into a degassing structure before reaching a clarifier.

The sludge recirculation is independent for each line and no sludge mixing is possible. Sequenced ditch aeration rate and intensity are managed by advanced aeration control, based on online N—NH4 and N—NO3 analyzers.

The difference in configuration between these two lines lies only in the way of extracting the sludge and the presence of the feast zone for the dense line. The sludge from the control line is extracted directly into the sequenced ditch, while that from the densified line is extracted from the recirculation tank, where a mobile pump is installed to feed the hydrocyclones skid use here as the selector. The stream containing the recovered dense aggregate sludge retained in the underflow of the hydro-cyclones is returned to the feast zone at the head of the Ldens line. The overflow of the hydrocyclones are pumped to the storage tank upstream of the sludge thickening treatment of the sludge line.

Both line having the same "biological design factors" may thus be compared while operated under the same "environmental factors" variation. Thus, a significant difference of sludge aggregate percentage and dSVI variations between the CAS (control line) and densified sludge (densified line) would substantiate the microbiome shift assumption on which the invention is based.

Analytical Methods

Quality of Treated Water

The quality of the treated water from the two lines is monitored weekly from average 24-hour composite samples, collected by the refrigerated automatic samplers, located in the recovery chute of each clarifier of the two lines to be compared.

The physico-chemical parameters monitored are pH, total COD (Chemical Oxygen Demand), soluble COD (0.45 μm), $BOD_5$ (Biological Oxygen Demand at 5 days), N—$NH_4$, N—$NO_3$, N—$NO_2$, total nitrogen (TN), total phosphorus (TP), P—PO4, Turbidity, TSS. The Kjeldahl nitrogen (TKN) is deduced by subtracting the N—$NO_x$ from the measured TN.

Apart from the pH, TSS (Total Suspended Solids) and turbidity measurements, carried out according to standard methods, all of the other analyzes are carried out with Macherey-Nagel rapid analysis kits by spectrophotometric method.

Sludge Settling

The sludge settling ability is evaluated using three indicators: the Mohlman index (SVI30), the diluted sludge volume index (dSVI30) normalized at 2 g/L and column batch sedimentation tests over 30 min (test de Kynch) which allow to derive the sludge settling velocity (ISV). The tests are carried out using freshly collected sludge (a maximum of half an hour between sampling and return to the laboratory), re-aerated for ten minutes in the laboratory before the start of the test, under controlled ambient temperature conditions (20±2° C.) and protected from direct solar radiation.

The SVI and dSVI measurements were carried out five times per week according to European standard EN 14709-1 with the particularity for the dSVI of always being reported at a target sludge concentration of 2.0 g/L in suspended matter, for the sake of fair comparison between the two lines. The column batch sedimentation profiles were carried out once a week according to the method described in Elena Torfs et al ("Experimental Methods In Wastewater Treatment." Edited by M. C. M. van Loosdrecht, P. H. Nielsen, C. M. Lopez-Vazquez and D. Brdjanovic. ISBN: 9781780404745 (Hardback), ISBN: 9781780404752 (eBook). Published by IWA Publishing, London, UK, pp 235-262): the ISVs are calculated from the steepest slope observed on three consecutive points of the first ten minutes of sedimentation. These Kynch tests were performed with sludge at the sample concentration in the treatment ponds as well as the reference concentration of 2.0 g/L using treated water as a diluent.

The concentration of sludge influencing the result of the Mohlman index and the fall speed observed during the undiluted Kynch tests (Kynch, C. J. "A theory of sedimentation". Transactions of the Faraday Society, Vol 48, 1952, pp 166-176;), the normalization of the sludge index dSVI and the speed measurements of ISV sedimentation at a low and identical reference MLSS (Mixed Liquor Concentration) concentration (2 g/L), eliminates the "edge effects" of the experimental devices, as well as the differences in concentration between the lines for a coherent and fair comparison of their settling indicators.

Dense Aggregate Fractions

The dense biomass aggregate concentrations were observed using sieves. A known sludge volume was poured over a pile of 500 μm and 200 μm sieve, and gently rinsed with low tap water flowrate until all smaller particles than sieve mech went through. Fraction above 500 μm, mostly debris were excluded. Fraction retained on 200 μm sieve was recovered by counter washing the sieve and analyzed for MLSS (105° C. for 24 h). The mass of aggregate obtained was normed to the sampling volume to obtain the aggregate concentration. The ratio of aggregate concentration to original sludge concentration gives the mass percentage of aggregate.

Production of Scum and Biological Foams

The production of scum is observed for each line based on the running time of its discharge pump, located at the degasser. A rotating scraper collects the floats on the surface of each degasser and sends them to an individual storage tank per line. The scum storage tank is emptied when the high-level threshold is triggered. The cumulative running time of the pump is therefore representative of the volume of floats produced, which makes it possible to monitor this production despite the absence of a flow meter.

Results

Inter-Seasonal Behavior

The plant has historically a fairly marked inter-seasonal behavior, with good sludge indices at the end of summer (70 to 130 mL/g) as well as a clear and recurring winter degradation, more or less severe depending on climatic conditions and the management of extractions. The historic reference range of winter dSVI ranges from 150 to over 300 mL/g during periods of filamentous bulking. Compared to this historical reference, the densified experimental line radically changes its behavior with winter sludge volume index lower in absolute value, and especially lower in amplitude of variation.

Figure 10:
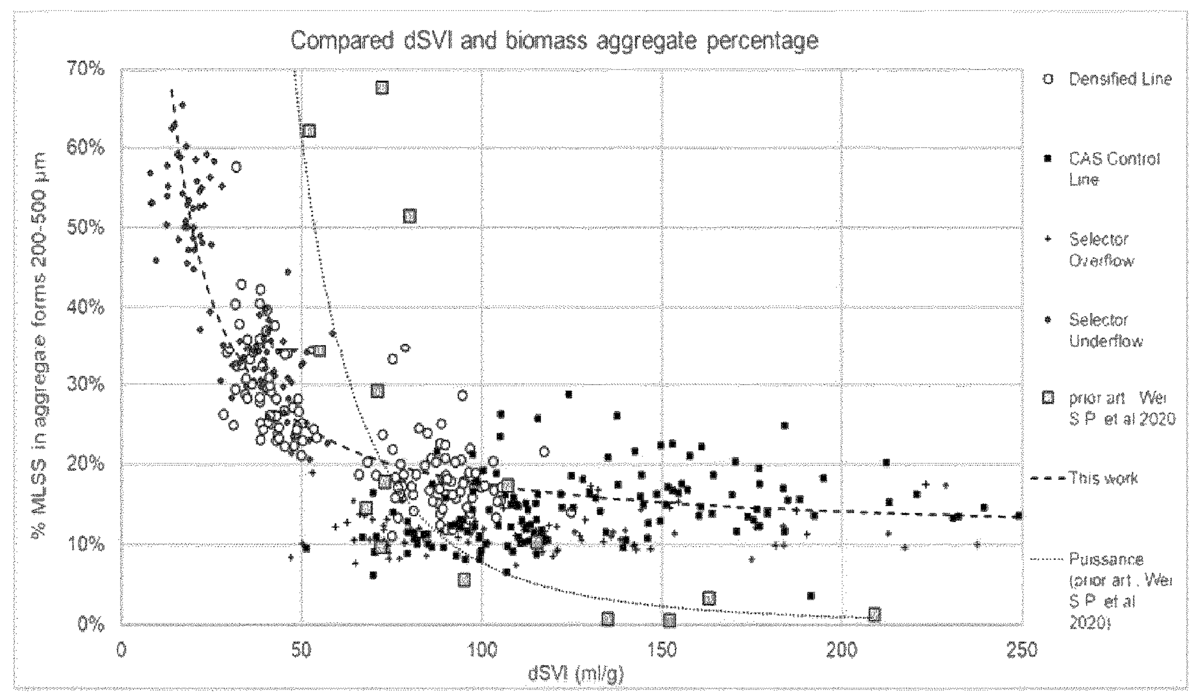
FIG. 10 is a scatter chart demonstrating the microbiome shift obtained with a densified line using the method of the invention (embodiment of FIG. 4) as compared with a control CAS biomass, as measured in the embodiment of the example.

FIG. 10 displays the comparative results observed with the experimental setup. It presents all the collected data for the couple dSVI and % aggregate observed during trials of a CAS line (Ltem) prior art activated sludge (black square points) in parallel of a densified sludge (round white filled points) line according to the invention, particularly the embodiment of FIG. 4.

FIG. 10 shows on one hand the prior art activated sludge application field represented by clusters of "big square grey points" (outlining "biological design factor" influence) and "small black square points" (outlining "environmental factors variation" influence).

Cluster "big square grey points" depicts prior art variation in between different CAS plants according to the biological design factors: every installation according to its raw water strength (concentration, flows and loads) and process design configuration leads to certain uncontrolled dSVI range made of certain portion of aggregated biomass. Correlation of the dSVI range with % aggregate range is outlined by the pointed line. The % aggregate is a function of the bioreactor system configuration, raw water strength (Wei S. et al). The aggregate proportion in the biological system thus drives the dSVI as outlined by the "pointed line".

Cluster "small black square points" depicts the prior art variation according to environmental factors, for a given CAS installation. These results are from the CAS control line (Ltem) of the presented experimental example. Usual annual variation of uncontrolled dSVI are met in free suspended biomass system. From 100 to 300 mL/g; 0 to 25% of aggregates (0-25% of which we estimate—through microscope and sieve laboratory analyses—that the major part is due to textiles microfibers arising from the decomposition of toilet paper). Based on those observation from trials, the dense biomass aggregates contained in this CAS sludge are estimated to be in the range of 0-10% only.

FIG. 10 shows on the other hand the microbiome shift obtained with the invention in the densified line (Ldens), with a visible bio-augmentation of dense biomass aggregates proportions in the biological system thanks to the synergistic effect of aggregate generating process (feast zone) and Selector (hydrocyclones) preferential retention. The selector allowing for the separation of:

Poor settling ability biomass recovered at the selector overflow (fluffy flocs, pin flocs, filamentous flocs . . . ), i.e. "cross points" cluster, that displays uncontrolled dSVI range (60 to 300 mL/g; 5-18% aggregates) similar to the control line "black square" cluster, which are preferentially extracted from the biological system, Superior settling ability biomass recovered at the selector underflow (recovered dense biomass aggregates: dense flocs, aerobic granular sludge, detached biofilm in suspension) i.e. "black diamond points" cluster that displays optimized and controlled SVI range 15 to 70 mL/g; 20% to 70% aggregates, which are preferentially retained in the biological system.

Said bioaugmentation of dense biomass aggregates resulting in a denser biomass obtained in the biological system of the Ldens line, i.e. densified sludge represented by "round white filled points" cluster that displays optimized and controlled SVI range 35-100 mL/g; 10-43% aggregates.

The "dashed line" identified as "this work" in the FIG. 10 clearly outlines the correlation of the percentage of dense biomass aggregate with the resulting dSVI. The invention, by shifting in a controlled manner the proportion of dense biomass aggregate in the densified sludge thus provides a way to control the operational dSVI. As previously mentioned, the invention aims at a partial granulation of the free suspended biomass. The "dashed line" clearly outline that the rise of percentage of aggregate above 50% does not bring any significant additional dSVI improvement, thus it appears worthless to pursue higher aggregate proportions in an industrial context.

While both lines were operated under the exact same environmental variation (same effluent, same pollution load, same temperature, same rain fall event), the fact that the experimental line according to the invention (Ldens) displays higher aggregate proportion and lower dSVI values and variation than the control line (Ltem) substantiate the microbiome shift.

Comparative Evolution of Aggregate Proportion and Diluted Sludge Volume Index

Figure 11:
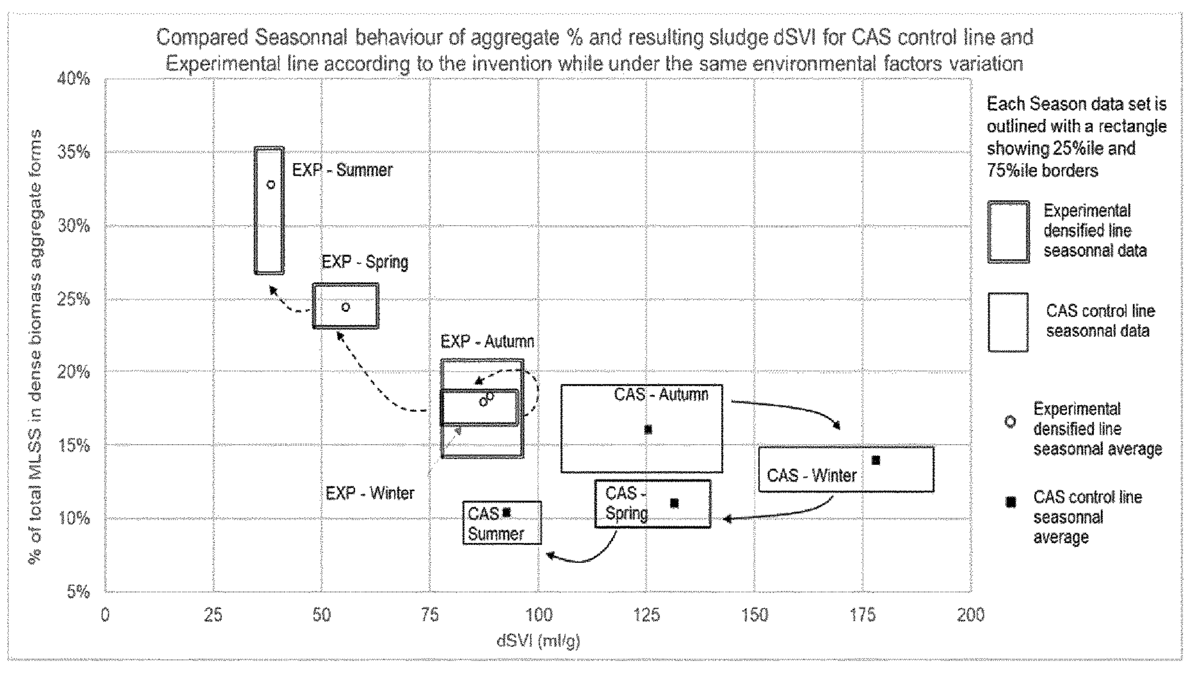
FIG. 11 is a scatter chart illustrating the seasonal behavior of densified sludge for a densified line using the method of the invention (embodiment of FIG. 4) versus a comparative conventional activated sludge method. Results are shown in terms of percentage of aggregates and dSVI, as measured in the embodiment of the example.

FIG. 11 illustrates the seasonal behavior of densified sludge (double line), as obtained with experimental line according to the invention, with the embodiment of FIG. 4, versus the control line with conventional activated sludge (simple line) in terms of percentage of aggregates and dSVI. The corners of rectangles outline the 25th percentile and 75th percentile of each seasonal data set. Points outline the average of each seasonal data set. Seasonal averages are round point and square point respectively for a densified line (implementing the method of the invention) and CAS line. This figure presents the compared seasonal statistical repartition of dSVI and percentage aggregate observed during trials of a CAS line in parallel of a densified sludge line according to the method of the invention. The data provided here are the same than that of FIG. 10, but this time sorted-out by seasons so as to observe the evolution of the dSVI and aggregate percentage variability.

These data show:

The increased percentage of aggregate observed on densified line (double line) VS CAS (simple line) which consolidate over time;

The narrower dSVI intra-seasonal and inter-seasonal variations for densified sludge (EXP line with "double line" outline) versus CAS (CAS line with "simple line" outline);

The lower absolute values in terms of dSVI for the densified sludge (double line).

While the CAS control line sludge experienced a bulking period during the winter, with a loss of aggregate proportion and a degradation of its dSVI; the densified sludge maintained its aggregate proportion throughout the winter and further consolidated it over time, leading to excellent settling characteristics with a controlled low dSVI. The densified sludge proved to be insensible to the undergone environmental factor variation that however did considerably impacted the CAS sludge settling ability.

Since the environmental factors and biological deign factor were the same for both lines during the experiment, the marked differences in seasonal patterns observed between the two different sludges on the FIG. 11 further substantiate the microbiome shift obtained with the invention.

When observing the CAS control line data (square points and single line), it can be noticed the rather cyclic behavior of the naturally present aggregate proportions and dSVI pattern owing to environmental factor variations: in winter and spring, the CAS line loose its aggregate proportions due to the sludge wastage and because environmental conditions does not enable to create or sustain aggregate forms. The inevitable impact is the increase of dSVI in winter period which may further be induced by filamentous organisms that may appear and proliferate in this specific period. As the meteorological conditions get better throughout spring and summer, the dSVI gets progressively better when reaching the highest aggregate proportion. It is to be mentioned that the protocol used for aggregate fraction only distinguish the retained biomass by size: the autumnal and winter results obtained higher in aggregate proportion than summer for the CAS line may be related to the filamentous bulking of the sludge, because the filamentous flocs may be larger than the sieve mesh, thus accounted for in the results, but they don't in reality meet the "dense" definition given for dense biomass aggregates. The dSVI pattern observed for CAS however illustrates greatly the uncontrolled cyclic interannual variation suffered by the conventional activated sludge because of changing environmental factors.

While observing the densified biomass data (round points and double line), it can be noticed that the aggregate percentage already detaches from the CAS behavior in the first season while operating according to the invention. The increased aggregates percentage in autumn is furthermore not reduced during the winter unfavorable environmental factors period unlike the CAS biomass. The aggregate percentage and dSVI continuously improve along the spring, illustrating the progressive microbiome shift phenomenon of enrichment of dense biomass aggregate forms in the experimental line operated according to the invention. In the summer, the densified line has reached the aggregate proportions targeted by the invention (preferably 20-40%), and the wastage of sludge was then adjusted in between the two sources of waste activated sludge WAS to maintain this controlled aggregate proportion in the following operation.

Comparative Analysis of Sludge Sedimentation Rates

Further tests have demonstrated that the rate of fall of the densified sludge according to the invention remained clearly higher than that of conventional activated sludge. At current operating concentrations encountered on the tested WWTP in winter (2.5 to 4 g/L in MLSS), the densified sludge settling velocity remained consistently above 1.44 m/h with an average of 3.35 m/h against an average of 1.38 m/h for conventional activated sludge. Densified sludge reached a maximum of 9.0 m/h in summer period while the CAS sludge barely reached 5.0 m/h in these favorable conditions.

Moreover, the selection effect of the hydrocyclones selector was observed on the extracted sludge: those kept in the underflow had excellent settling characteristics with speeds greater than 6 m/h while the "light" fraction released in the overflow settled significantly worse than the fed densified sludge, but still better than the CAS control line.

Given these quantified phenomena, the question of a potential lower quality of the sludge extracted as the second source of WAS proposed by the invention, i.e the overflow of the hydrocyclone, could arise. The results obtained do not seem to confirm this postulate, on the contrary they demonstrate an overall improvement, including the so-called "light" fraction of the densified line. As the fall velocities measured for the sludge from the cyclone overflow during the experiment were greater than those of the control line, the selection pressure at extraction allows the gradual enrichment of dense biomass. Consequently, the fraction released in overflow ends up improving its settling ability over time and to a level higher than the conventional biomass, and that more particularly in winter during a period of filamentous bulking undergone in CAS line because of unfavorable environmental factors.

Impact on Treated Water

The study of the quality of the treated water showed a slight improvement in almost all of the parameters studied for the densified line. There were no significant changes in soluble COD or in dissolved forms of mineral or ammoniacal nitrogen. However, the densified sludge had a noticeable impact on the reduction of particulate pollution, as evidenced by the TSS and turbidity results: the densification of the sludge allowed a better resilience of the clarification system under hydraulic peak rainfall conditions, making it possible to obtain a much better stability on the quality of TSS at the discharge. The performance dispersion was greatly reduced with, on average, values of 6.9 (±2.0) mg/L of TSS for the densified line against 11.9 (±5.9) mg/L of TSS for the control CAS line over the studied period. The standard deviations around the mean were notably reduced for Ldens.

The performance gain in reducing particulate pollution with densified sludge resulted in a slight but significant improvement in the total Nitrogen, Kjeldahl Nitrogen and total Phosphorus parameters related to TTS quality improvement.

Impact on the Quantity of Scum Produced

Another advantage of densification obtained with the invention is the reduction in the production of scums and floating matters. This positive effect, not anticipated at the start of the project, was firstly visually observed at the degassing tank and on the surface of clarifiers and anaerobic zone at the head of the biological treatment line.

The winter preceding the implementation of densification on the experimental line, the two lines had a similar production of floating matters, while this production was almost reduced to zero for the Ldens line in the following winter, when densification was in place on the experimental line. This effect can be explained by the selection pressure on sludge extraction which tends to preferentially evacuate the filaments towards the sludge line. It was microscopically observed that densified biological sludge has a more compact biomass appearance, with more defined and less branched flocs, containing less filamentous organisms. The transition effect of the treatment system towards a densified biomass was clearly observed by microscopic observations: the activated sludge biomass operated according to invention migrated in the form of a consortium of dense flocs and aggregates which gave it its increased settling characteristics.

Oxygen Transfer Enhancement

During the trials, it was identified that the dissolved oxygen (DO) curves obtained during the daily automatic air pulse (for diffuser preservation purpose) behaved differently for CAS and densified biomass. Densified biomass seemed to reach higher DO level in shorter times despite similar MLSS and similar load applied to experimental line according to the invention and CAS control line.

Some tests were performed to establish difference in behavior during in situ oxygen transfer test in sludge. The test consisted in stopping the air in the biological treatment aeration zone during the needed time to reach a zero dissolved oxygen (DO) level, then restarting the aeration at full blower capacity for approximately one and a half hour, then reducing the blower capacity for another approximated one and a half hour, then the air is stopped again so as to observe the sludge oxygen uptake rate (OUR). The DO profiles obtained are presented in FIG. 12.

Figure 12:
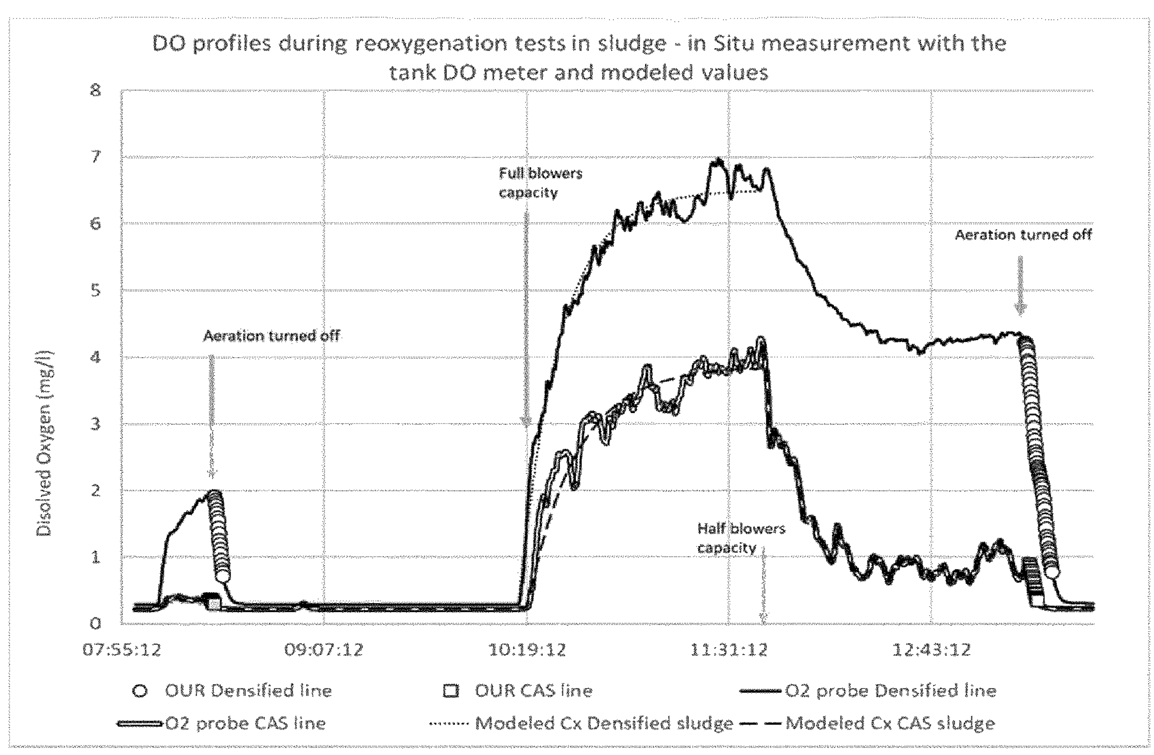
FIG. 12 is a graph illustrating the oxygen transfer enhancement, as measured in the embodiment of the example.

FIG. 12 presents the compared oxygenation profile measured and recorded every 10 seconds on the densified sludge (simple line) and CAS sludge (double line) during in situ oxygenation tests, using the probes in place in the line to perform the measurement. Modelled DO values are outlined by pointed line and dashed line respectively for densified and CAS sludge. Square and round points indicate the period from which the OUR were calculated, respectively for densified and CAS sludge.

As it can be observed qualitatively on this figure, the DO rises much quicker and much higher for the densified sludge than for the CAS sludge, despite equivalent blower capacities and similar OUR observed (actually, OUR was slightly higher in dense line).

The use of a simple parametric model, modelling the DO according to a combined alpha*Kla (αKla) factor parameter, measured OUR, and site physical conditions (Atm pressure, temperature, tank depth) was used:

$$\frac{dCx}{dt} = \alpha Kla\ .\ (Cs^* - Cx).\ dt - OUR.\ dt$$

Where

Cx is the modeled DO concentration in the liquid,

α is the alpha factor which reflects the effect of transfer loss due to sludge presence in comparison to clear water transfer, Kla is the volumetric mass transfer coefficient of the aeration system, Cs* is the saturated oxygen concentration in water in the experimental conditions (temp & pressure, as well as oversaturation due to tanks depth), OUR is the oxygen uptake rate of the biomass.

Since both the Kla and alpha factors are unknown in this test, only the combined αKla value can be approached with this experiment. The model parameter αKla factor was fitted with least square roots error reduction method between real DO data and modeled data. in order to obtain an approximate alpha*KLa factor value in both cases. The obtained αKla for densified line ratio to αKla for CAS line provides some insights about the aeration transfer benefits. The results obtained showed an approximate +15% to +25% for the value αKla of densified sludge as compared to the CAS sludge. Both lines being exactly configurated with the same diffuser system and blower capacity, the Kla are considered equal in both cases thus the alpha factor of the densified sludge shall, according to the observed results, be better than the alpha factor of CAS sludge for a given MLSS concentration.

It is speculated that the structure of sludge morphology obtained with the microbiome shift according to the invention may decrease the sludge viscosity and air bubble interference for a given MLSS concentration as compared to CAS. The aeration transfer would therefore be improved through the enhancement of alpha factor.

Some further dedicated research tests are needed in the future to measure the alpha factor more precisely with an adequate apparatus and standard method in order to fully understand the implication and benefits of densified sludge on the oxygen transfer efficiency. Yet, the quick assessment method described above revealed that the densified sludge according to the invention enhances the oxygen transfer rates, enhancement for which the driving mechanisms are still to be investigated.

Sludge Thickening Ability and Clarifier Design

Figure 13:
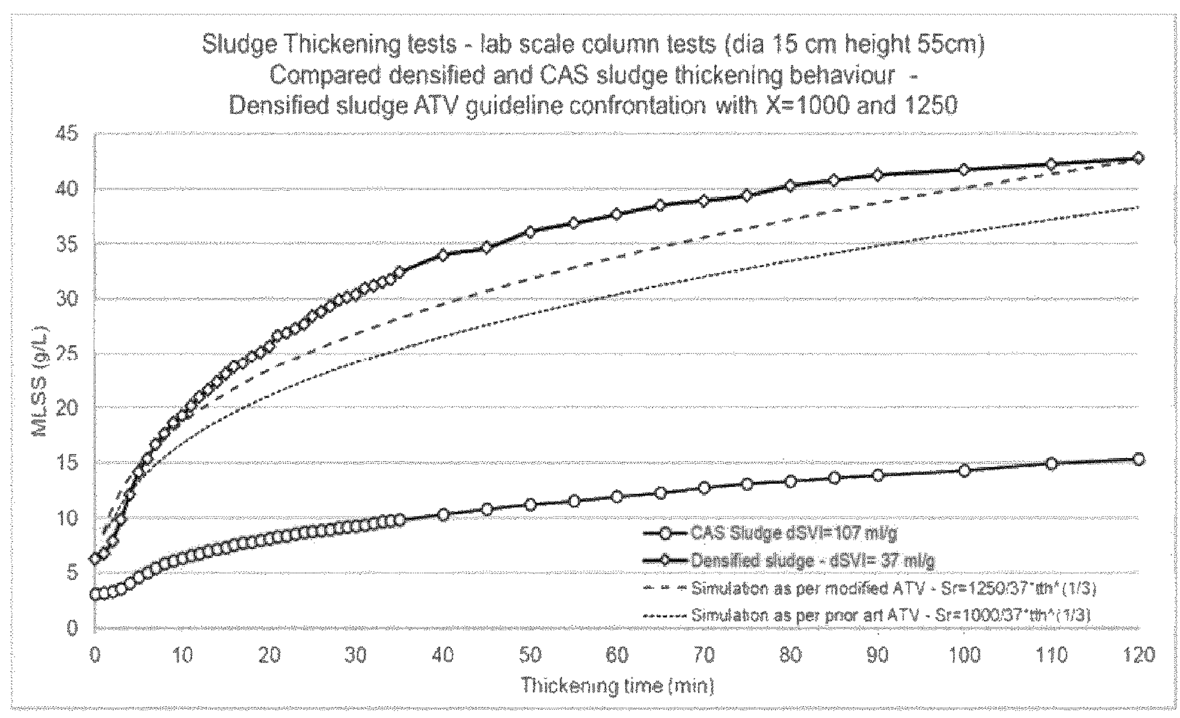
FIG. 13 is a graph illustrating the sludge thickening ability, as measured in the embodiment of the example; more specifically, FIG. 13 describes densified and CAS sludge measured thickening profiles, confronted with ATV A131 model, and a proposed modified ATV model for the densified sludge thickening behavior according to the invention.

FIG. 13 describes the results obtained for densified sludge (black continuous line with diamond points) and CAS sludge (black continuous line with round points) during sludge thickening test carried out at lab scale. The freshly sampled sludges were placed in graduated settling column, 15 cm in diameter and 55 cm in height, for 2 hours thickening test. The sludge concentrations were calculated based on initial mass introduced to the dynamic evolution of sludge blanket volume. Both sludges were sampled on the same day during the summer period, with a dSVI of 37 ml/g and 107 ml/g respectively for densified sludge and CAS sludge.

The thickening profiles are displayed in on FIG. 13. These clearly indicated that the densified sludge thickens much faster than the CAS sludge and reaches a much higher terminal 2 hours thickening concentration:

Densified sludge reaches the CAS sludge 2 hours terminal thickening concentration of 15 g/L MLSS after only 6 minutes.

Densified sludge reaches a 2 hours thickening terminal concentration of 40 g/L MLSS which 2.66 times more than for the CAS sludge.

In contrast, ATV standard guideline use the following equation to model the activated sludge thickening behavior over time:

$$Sr = \frac{C}{dSVI} \times tth^{1/3}$$

With:

Sr the modeled sludge concentration obtained in g/L MLSS

C a fixed factor that is equal to 1000 in the ATV guidelines dSVI the diluted sludge volume index of the sludge in ml/g tth the thickening time in hours As plotted on FIG. 13, the modeled densified sludge thickening according to ATV guideline (pointed line: Simulation as per ATV−Sr=1000/37tth^(⅓)) does not match with the real thickening behavior results obtained.

A modified simulation approach was tested by modifying the value of the C factor of the ATV guideline in order to better match with densified sludge thickening reality. The C factor was found to be around 1250 for getting a modeled 2 hours terminal concentration matching the measured concentration. This modified ATV approach for densified sludge thickening behavior is also plotted on FIG. 13 (dashed line: Simulation as per modified ATV—Sr=1250/371tth^(⅓)).

Figure 14:
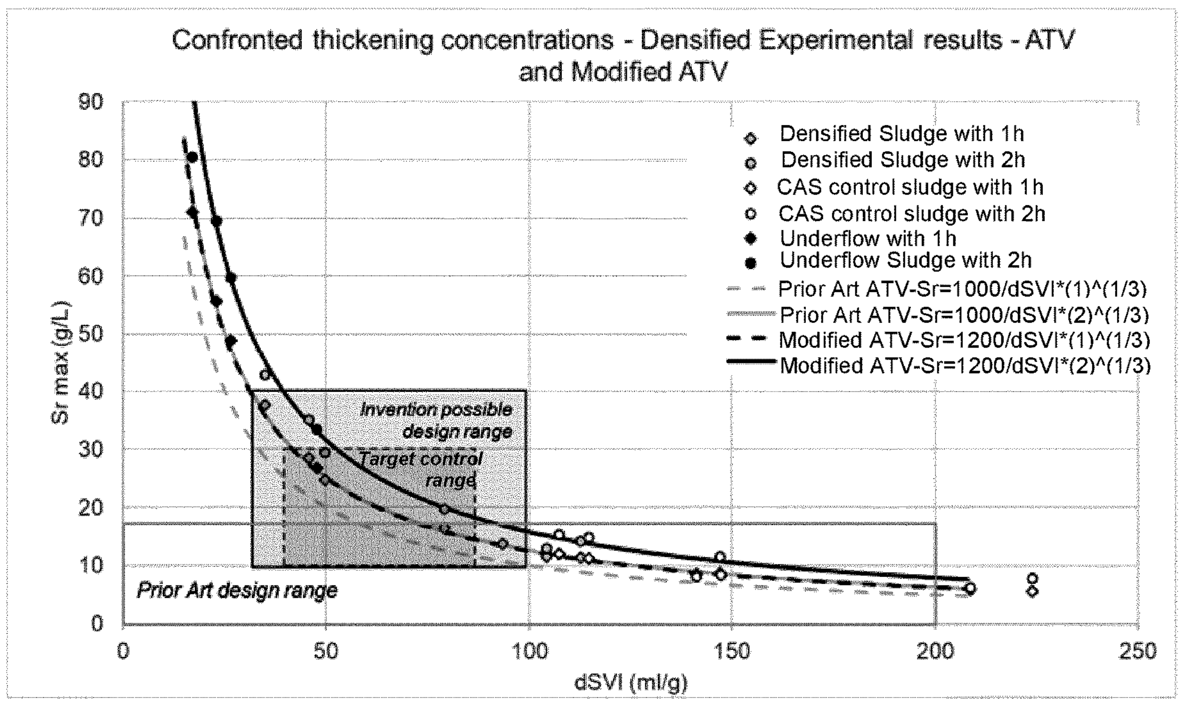
FIG. 14 is a graph illustrating the sludge thickening ability, as measured in the embodiment of the example; more specifically, FIG. 14 describes the relationship between measured Sludge Volume Index (SVI) and associated sludge concentration in a thickening column test, indicating the range of the graph beyond the original area of the grey rectangular displaying thickening-profiles in the ATV A131.

FIG. 14 summarizes several sludge thickening tests results carried out at different times and SVI, showing thickening concentrations obtained after 1 hour (diamond) and 2 hours (round) for underflow sludge (black filled points), densified sludge (grey filled points) and CAS sludge (white filled points). These results are confronted to the original ATV model (grey lines) and modified ATV model proposed above (black line) for 1 h (discontinuous lines) and 2 h (continuous lines) thickening times according to SVI.

The obtained densified sludge and underflow sludge points match the modified ATV model over a large range of SVI. With the invention, the achievable terminal thickening concentration of densified sludge can reach dSVI values of between 20 g/L and 40 g/L in a reasonable thickening times of 1 or 2 hours. The higher thickening rate allows for a reduction of the RAS-rate by 50%, which in return reduces the hydraulic loading of the clarifier by 25%. Further impacts of the densification as compared with the CAS of the ATV standard may be summarized as follows:

| | |
|---|---|
| Solids concentration at settler bottom SS bs | a 25% higher thickening rate at same thickening period of 2.0 hours to calculate solids concentration at settler bottom |
| Effluent concentration aeration tank SS eat | a 25% higher surface overflow rate is applied at the same sludge volume loading rate of 500 for horizontal flow clarifiers |
| Settling tank surface A st | the high surface overflow rate results in a proportionally smaller settler surface |
| clear water zone h1 | Clarification height unchanged |
| separation/return flow zone h2 | separation height reduced due to less recycle rate and less overflow-rate |
| storage/density flow zone h3 | storage height reduced due to less recycle rate |
| thickening/sludge removal zone h4 | thickening height reduced due to less recycle rate and less overflow-rate but increased by a higher influent solids concentration |

Such superior thickening ability of the densified sludge allows for clarifier designs which could not be achieve with the prior art. In particular, they allow for designing and operating secondary clarifiers at ca. 50% lower RAS-rates and 25% higher surface overflow rate, resulting in 10% less clarifier depth, 20% less clarifier surface and 37.5% less aeration tank volume. An exemplary design summary is presented in the table below.

| | SVI design (L/kg) | max RS (% of Qww) | tth (h) | C (SS bs) | SS bs (kg/m3) | qsv (L/(m2*h) | max qa (m/h) | SS eat (kg/m3) | A st (%) | h tot (m) | V st (%) | V at (%) |
|---|---|---|---|---|---|---|---|---|---|---|---|---|
| CAS according to ATV parameters | 120 | 75 | 2.0 | 1000 | 10.5 | 500 | 1.6 | 2.6 | 100.0 | 3.8 | 100.0 | 100.0 |
| Densified Biomass 1 | 80 | 56 | 2.0 | 1250 | 19.7 | 500 | 1.8 | 3.5 | 88.9 | 3.5 | 83.0 | 75.0 |
| Highly Densified Biomass | 60 | 37.5 | 2.0 | 1250 | 26.2 | 500 | 2.0 | 4.2 | 80.0 | 3.4 | 72.3 | 62.5 |

Conclusion

The invention proposes a method and an installation that allow for controlling the dSVI between 35 and 100 ml/g on activated sludge systems, via the controlled implementation of densified biomass, which is a consortium of dense biomass aggregates and flocculated biomass.

It is important to note that the invention does not aim for full granulation, but rather toward a controlled proportion of granulated form in the mixed liquor, with the right proportion of denser biomass forms needed to obtain a low dSVI, controlled and stabilized all year long regardless of climatic conditions variations (e.g. regardless of environmental factors).

The invention demonstrates a high potential for:

Improving the performance and competitiveness of biomass densification in continuous flow bioreactors by coupling it with the description of best-in-class embodiments with feast zone (aerated, anoxic, non-aerated), controlled based approach of influent flow mitigation, direct and selector overflow WAS source flow mitigation, returns and sidestream EBPRs;

Increasing competitiveness of clarifier and biotank volume that can be obtained by smartly integrating the selector to maximize densification success and control, and to combine it with other technology such as biofilm MABR to get synergistic effects;

Magnifying the effects of densification, through enhanced control of "microbiome shift" and active biomass inventories;

Super-intensification of biomass densification by coupling it with biofilm-based processes through the multiple SRTs management approach and the reduction of minimum aerated SRT for nitrifiers;

Optimizing all biomass type inventory and kinetics potential through the control of SRT uncoupling ratios.

The invention claimed is:

1. A method for controlled biomass densification in a biological treatment of a raw influent, comprising:

a step of feeding a biological tank containing free suspended biomass with the raw influent through a first inlet of the biological tank and subjecting the raw influent to a biological treatment of free suspended biomass, thereby producing a biomass comprising activated sludge (AS);

a step of separation and/or clarification of the activated sludge (AS), thereby producing an effluent and a return activated sludge (RAS);

a step of extracting at least part of the return activated sludge (RAS) and/or part of the activated sludge (AS), the return activated sludge (RAS) and/or the activated sludge (AS) forming a first source of a waste activated sludge (WAS);

a step of external density-based selection of at least part of the return activated sludge (RAS) and/or part of the activated sludge (AS), thereby generating an overflow forming a second source of waste activated sludge (WAS) from which waste activated sludge (WAS) is extracted, and an underflow comprising a first part of dense biomass aggregates;

a step of producing and/or sustaining a second part of dense biomass aggregates by a dense biomass aggregates generating process, with at least part of the raw influent;

a step of feeding the biological tank with the second part of dense biomass aggregates through a second inlet of the biological tank and subjecting the second part of dense biomass aggregates to the biological treatment;

a step of subjecting the first part of dense biomass aggregates of the underflow to the biological treatment and/or to the dense biomass aggregates generating process;

thereby obtaining a densified biomass;

a step of controlling the amount of the raw influent fed to the dense biomass aggregates generating process and/or a step of controlling the amount of the waste activated sludge (WAS) extracted from the first source of the waste activated sludge (WAS) and/or from the second source of the waste activated sludge (WAS):

the method being carried out so as to maintain a densified biomass having:

a dSVI between 35 and 100 ml/g, and/or more than 10% of particles with a particle size of between 100 μm and 1000 μm, and/or a dSVI30/dSVI10 ratio comprised between 70% and 95%.

2. The method of claim 1, wherein the dense biomass aggregate generating process of the step of producing and/or sustaining the second part of dense biomass aggregates is performed in a contact zone fed by the underflow and at least part of the raw influent.

3. The method of claim 2, wherein the contact zone comprises a membrane aerated biofilm reactor placed within said contact zone.

4. The method of claim 1, wherein the dense biomass aggregate generating process of the step of producing and/or sustaining the second part of dense biomass aggregates comprises an aerobic, anoxic or anaerobic biofilm-based process, wherein the dense biomass aggregate generating process is fed with at least part of the raw influent, thereby generating a biofilm biomass, a biofilm biomass excess being sloughed in the form of free suspended nitrifying or denitrifying or anaerobic biofilm to the biological treatment process step.

5. The method of claim 1, further comprising a fermentation step allowing the production of volatile fatty acids (VFA), the method comprising:

a step of controlling the amount of activated sludge (AS) or return activated sludge RAS subjected to a fermentation step; and/or a step of controlling the amount of the underflow subjected to the fermentation step; and/or a step of controlling an amount of a stream containing VFA fed to a dense biomass aggregate production and/or sustaining unit.

6. The method of claim 1, further comprising a step of feeding the dense biomass aggregates generating process with an additional stream comprising at least VFA and/or readily biodegradable carbon.

7. The method of claim 1, wherein the step of controlling the amount of the raw influent fed to the dense biomass aggregates generating process, and/or the step of controlling the amount of the waste activated sludge (WAS) extracted from the first source of the waste activated sludge (WAS) and/or from the second source of the waste activated sludge (WAS), are configured so as to maintain a densified biomass having:

a dSVI between 40 and 70 ml/g, and/or between 20% and 40 of particles with a particle size of between 200 μm and 500 μm maintained, and/or a dSVI30/dSVI10 ratio comprised between 70% and 85%.

8. The method of claim 1, wherein:

the step of separation is performed in a clarifier, said clarifier being operated so as to achieve:

a thickening performance achieving a solids concentration between 20 to 30 g/L at the bottom of the clarifier, and/or a RAS rate of ca. 30 to 60% of the influent flow-rate, and/or an upflow velocity (SOR) between 1.0 and 4.0 m/h, and/or a surface load rate comprised between 8.5 and 33.8 $kgMLSS.m^{-2}h^{-1}$, or the step of separation is performed in a membrane reactor (MBR), said membrane reactor (MBR) being operated so as to achieve:

a reduced frequency of maintenance cleaning cycles of the polymeric membranes wherein maintenance cleanings are reduced together with reagent consumption to a frequency of once a week or below without shortening the membrane life time.

9. The method of claim 1, wherein the second part of dense biomass aggregates sustained comprises or consists of aerobic granular sludge (AGS) or biofilm.

10. An installation for controlled biomass densification in a biological treatment of a raw influent, said installation comprising:

a biological tank containing free suspended biomass having a first inlet, a second inlet and a first outlet, the biological tank being configured to be fed at the first inlet with at least a part of the raw influent and return activated sludge (RAS) to produce a mixture of treated water and activated sludge (AS) recovered at the first outlet;

a separation unit, having a first inlet, a first outlet and second outlet, the separation unit being configured to be fed at the first inlet with the activated sludge (AS) and to produce an effluent recovered at the first outlet and a return activated sludge (RAS) recovered at the second outlet;

an extracting device configured to extract at least part of the return activated sludge (RAS) and/or part of the activated sludge (AS) as a first source of a waste activated sludge (WAS);

an external gravity-based selector having a first inlet, a first outlet and a second outlet, the external gravity-based selector being configured to be fed at the first inlet by at least part of the return activated sludge (RAS) and/or part of the activated sludge (AS) and to generate an overflow at the first outlet forming a second source of the waste activated sludge (WAS) from which waste activated sludge (WAS) is extracted and an underflow comprising a first part of dense biomass aggregates recovered at the second outlet;

a dense biomass aggregate production and/or sustaining unit having a first inlet, optionally a second inlet, a optionally third inlet, and a first outlet, the dense biomass aggregate production and/or sustaining unit tank being configured to be fed at the first inlet with at least a part of the raw influent and optionally at the second inlet with the underflow and to form a second part of dense biomass aggregates;

the biological tank being further configured to be fed at the second inlet with the produced second part of dense biomass aggregates of the production and/or sustaining unit and optionally with at least part of the first part of dense biomass aggregates of the underflow, thereby obtaining a densified biomass;

a controller of the amount of the raw influent fed to the dense biomass aggregate production and/or sustaining unit and/or a controller of the amount of the waste activated sludge (WAS) extracted from the first source of the waste activated sludge (WAS) and/or from the second source of the waste activated sludge (WAS).

11. The installation of claim 10, wherein the dense biomass aggregate production and/or sustaining unit is a contact zone and/or a membrane aerated biofilm reactor, or a contact zone including a membrane aerated biofilm reactor.

12. The installation of claim 10, wherein the dense biomass aggregate production and/or sustaining unit is further configured to be fed at the third inlet with an additional stream comprising at least VFA and/or readily biodegradable carbon.

13. The installation of claim 10, comprising a fermentation tank having a first inlet, a second inlet and a first outlet, the fermentation tank being configured to be fed at the first inlet with at least part of the activated sludge (AS) and/or at least part of the return activated sludge (RAS) and/or at the second inlet with at least part of the underflow, and to produce a stream comprising VFA recovered at the first outlet, the dense biomass aggregate production and/or sustaining unit being configured to be fed at the third inlet with the stream comprising VFA and/or the biological tank being configured to be fed at the second inlet with the stream comprising VFA.

14. The installation of claim 13, further comprising:

a controller of the amount of activated sludge (AS) or return activated sludge (RAS) fed at the first inlet of the fermentation tank; and/or a controller of the amount of underflow that is fed at the second inlet of the fermentation tank; and/or a controller of the amount of the stream containing VFA fed at the third inlet of the dense biomass aggregate production and/or sustaining unit, the biological tank being configured to be fed at the second inlet by the remaining part of the stream containing VFA.

15. The installation of claim 10, wherein the second part of dense biomass aggregates produced or sustained comprises or consists of aerobic granular sludge (AGS) or biofilm.

16. A method for controlled biomass densification in a biological treatment of an influent, comprising:

a step of feeding a biological tank containing free suspended biomass with the influent through a first inlet of the biological tank and subjecting the influent to a biological treatment of free suspended biomass, thereby producing a biomass comprising activated sludge (AS);

a step of separation and/or clarification of the activated sludge (AS), thereby producing an effluent and a return activated sludge (RAS);

a step of extracting at least part of the return activated sludge (RAS) and/or part of the activated sludge (AS), the return activated sludge (RAS) and/or the activated sludge (AS) forming a source of a waste activated sludge (WAS);

a step of producing and/or sustaining dense biomass aggregates by a dense biomass aggregates generating process, with at least part of the influent;

a step of feeding the biological tank with the dense biomass aggregates through a second inlet of the biological tank and subjecting the dense biomass aggregates to the biological treatment with retention of a biomass-fraction with a higher solids retention time (SRT), which results in the accumulation of organisms with biological nutrient removal activity;

the method being carried out so as to maintain a densified biomass having:

a dSVI between 35 and 100 ml/g, and/or more than 10% of particles with a particle size of between 100 μm and 1000 μm, and/or a dSVI30/dSVI10 ratio comprised between 70% and 95%.

17. The method of claim 16, further comprising a fermentation step allowing the production of volatile fatty acids (VFA), the method comprising the controlling of an amount of a stream containing VFA fed to a dense biomass aggregate production and/or sustaining unit.

18. The method of claim 17, wherein the dense biomass aggregate production and/or sustaining unit is a contact or feast zone.

* * * * *